United States Patent
Fujii

(10) Patent No.: US 7,151,846 B1
(45) Date of Patent: Dec. 19, 2006

(54) APPARATUS AND METHOD FOR MATCHING FINGERPRINT

(75) Inventor: Yusaka Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 500 days.

(21) Appl. No.: 09/665,159

(22) Filed: Sep. 19, 2000

(30) Foreign Application Priority Data

Oct. 14, 1999  (JP)  ................................ 11-292847

(51) Int. Cl.
*G06K 9/00* (2006.01)

(52) U.S. Cl. ...................................... 382/125; 382/192

(58) Field of Classification Search ........ 352/124–127, 352/190–192, 201–203, 209; 356/71; 283/68; 340/5.82, 5.83, 5.52, 5.53; 235/494

See application file for complete search history.

(56) References Cited

U.S. PATENT DOCUMENTS

| | | | |
|---|---|---|---|
| 4,310,827 A | | 1/1982 | Asai |
| 4,944,021 A | * | 7/1990 | Hoshino et al. ............ 382/125 |
| 5,524,161 A | * | 6/1996 | Omori et al. ............... 382/125 |
| 5,937,082 A | * | 8/1999 | Funada ....................... 382/125 |
| 5,960,101 A | * | 9/1999 | Lo et al. ..................... 382/125 |
| 6,049,621 A | * | 4/2000 | Jain et al. ................... 382/125 |
| 6,233,348 B1 | * | 5/2001 | Fujii et al. .................. 382/125 |
| 6,289,112 B1 | * | 9/2001 | Jain et al. ................... 382/116 |

FOREIGN PATENT DOCUMENTS

| | | |
|---|---|---|
| JP | A 52082163 | 9/1977 |
| JP | A 52082164 | 9/1977 |
| JP | A 56024675 | 9/1981 |
| JP | 11-195119 | 7/1999 |

OTHER PUBLICATIONS

Takagi, M., et a., "Handbook of Image Analysis," partial translation of (3) Hough Transformation, Jan. 17, 1991.
Jain A. K., et al., "An Identity-authentication System Using Fingerprints", Proceedings of the IEEE, Sep. 1997, IEEE, USA, vol. 85, No. 9, pp. 1365-1388.
Isenor D. K., et al., "Fingerprint Identification Using Graph Matching", Pattern Recognition, Pergamon Press Inc. Elmsford, NY, US, vol. 19, No. 2, 1986, pp. 113-122.
Michio Yamada et al., "A Proposal of Description Method of Fingerprint Structure and Identification Algorithm Using Geometric Characteristics", vol. J76-D-11, No. 9, pp. 2001-2014.
The Institute of Electronics, Information and Communication Engineers, "A Proposal of Verification/Image Coding Schemes by Fingerprint Image Structuring", vol. 97, No. 112, pp. 1-8.
Notice of Rejection Grounds for corresponding Japanese Application No. H11-292847 dated Feb. 14, 2005.

* cited by examiner

*Primary Examiner*—Samir Ahmed
(74) *Attorney, Agent, or Firm*—Staas & Halsey LLP

(57) ABSTRACT

After processing, a target feature point is detected. Information about a target feature point includes the position of the ridge containing a vicinal feature point relative to the position of the ridge containing the target feature point in addition to the position, type, and direction of the target feature point. Then, the information is checked in a matching process, and the vicinal feature point is checked on a feature point contained in a ridge matching in position the ridge of the target feature point. When the target feature point and the vicinal feature point match in position and direction, and are different in type only, the mark has a value indicating a matching level. Then, a matching result of the vicinal feature points is obtained as a matching mark, and it is determined whether the target feature point is matching by determining whether the matching mark is equal to or larger than a threshold.

49 Claims, 31 Drawing Sheets

| ID 11 |
|---|
| POSITION |
| TYPE |
| DIRECTION |
| 0-TH : ID 10<br>FIRST : ID 9<br>SECOND : ID 9<br>MINUS FIRST : ID 12<br>MINUS SECOND : ID 13 |
| ID 12 |
| POSITION |
| TYPE |
| DIRECTION |
| 0-TH : - - - - - -<br>FIRST : - - - - - - |

F I G. 4

| ID 11 |
|---|
| POSITION |
| TYPE |
| DIRECTION |
| 0-TH VIRTUAL : ID 9<br>FIRST VIRTUAL : ID 12<br>SECOND VIRTUAL : ID 8<br>MINUS FIRST VIRTUAL : ID 13<br>MINUS SECOND VIRTUAL : ID 12 |
| ID 12 |
| POSITION |
| TYPE |
| DIRECTION |
| ⋮ |

FIG. 15

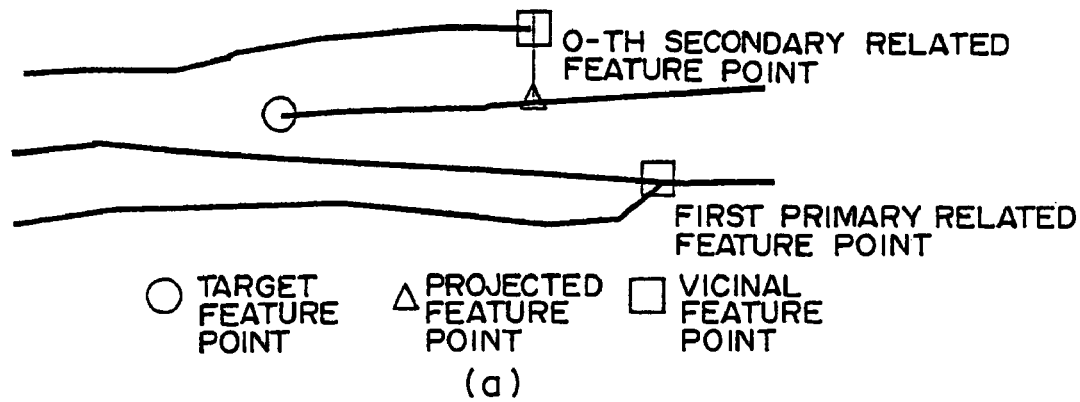
(a)
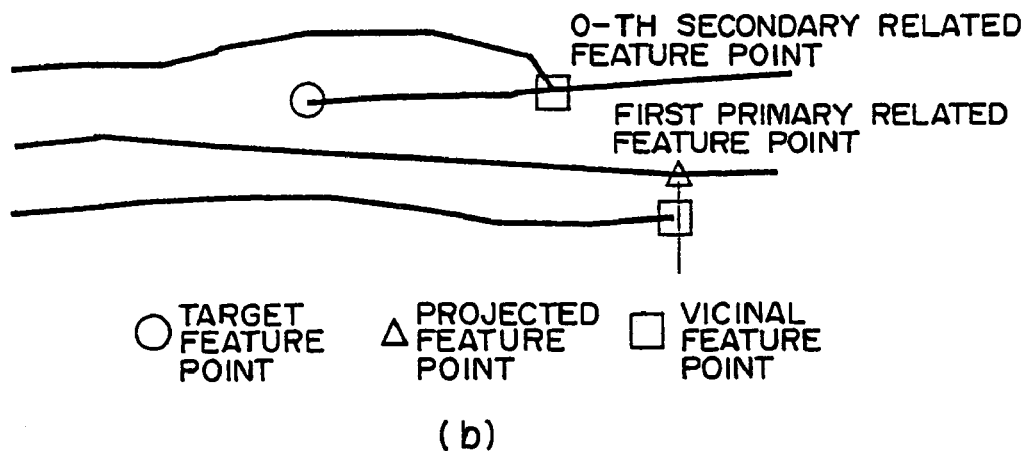
(b)
FIG. 16

| |
|---|
| ID 11 |
| POSITION |
| TYPE |
| DIRECTION |
| 0-TH PRIMARY : ID 10<br>FIRST PRIMARY : ID 9<br>SECOND PRIMARY : ID 9<br>MINUS FIRST PRIMARY : ID 12<br>MINUS SECOND PRIMARY : ID 13<br>0-TH SECONDARY : ID 9<br>FIRST SECONDARY : ID 12<br>SECOND SECONDARY : ID 8<br>MINUS FIRST SECONDARY : ID 13<br>MINUS SECOND SECONDARY : ID 12 |
| ID 12 |
| ⋮ |

FIG. 18

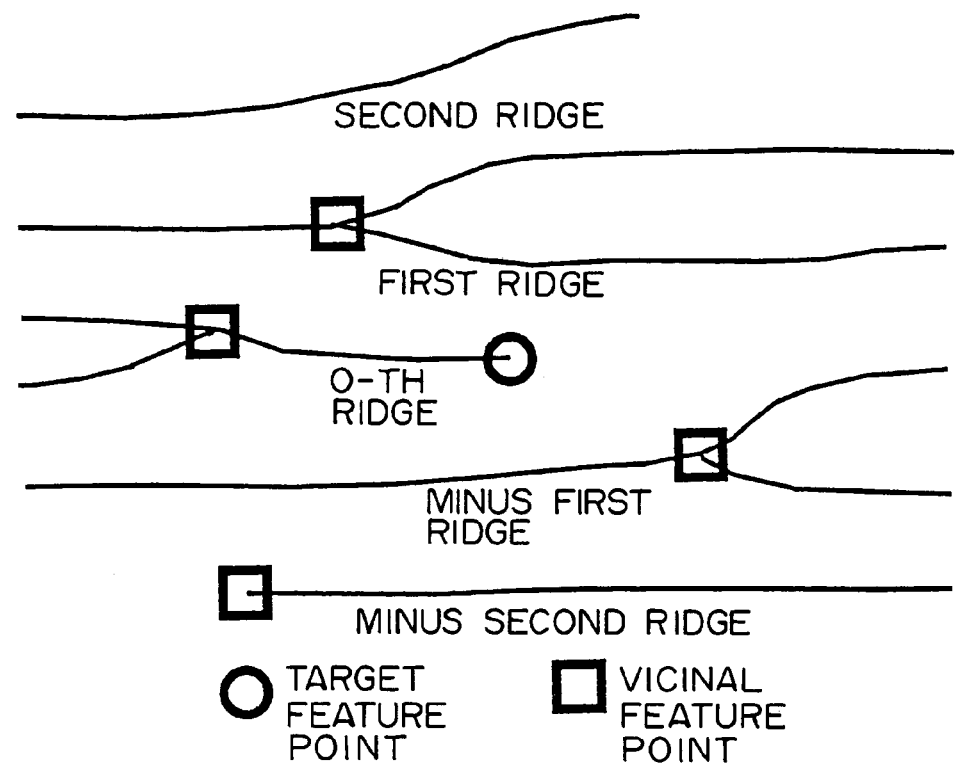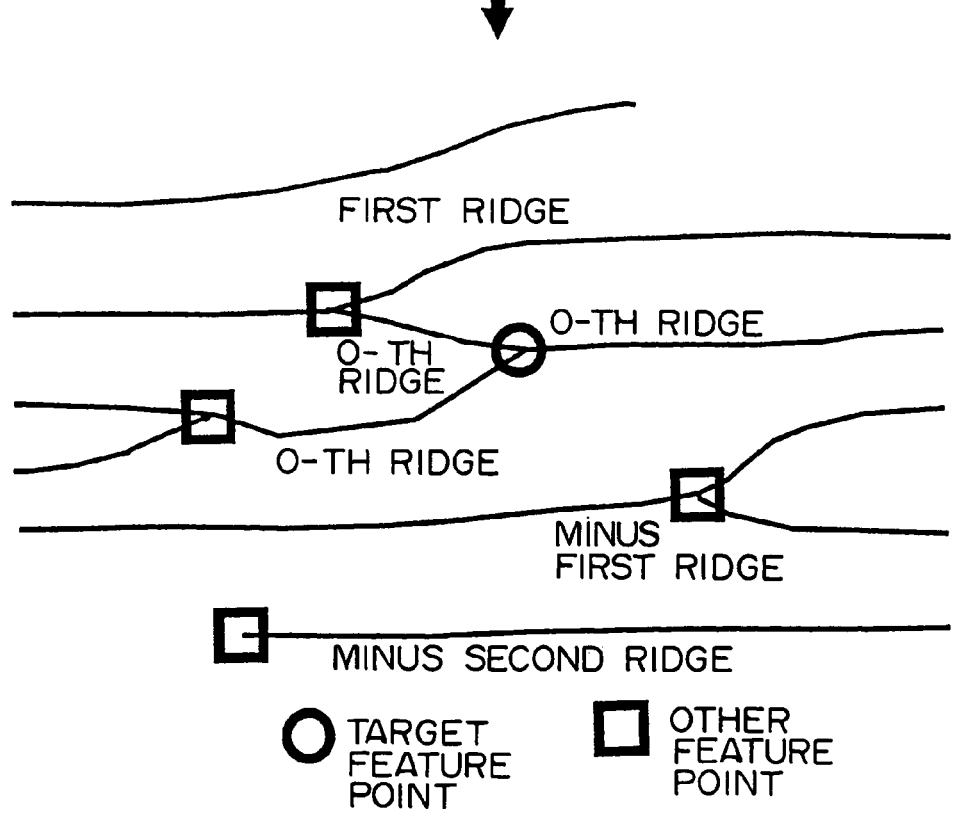
FIG. 19

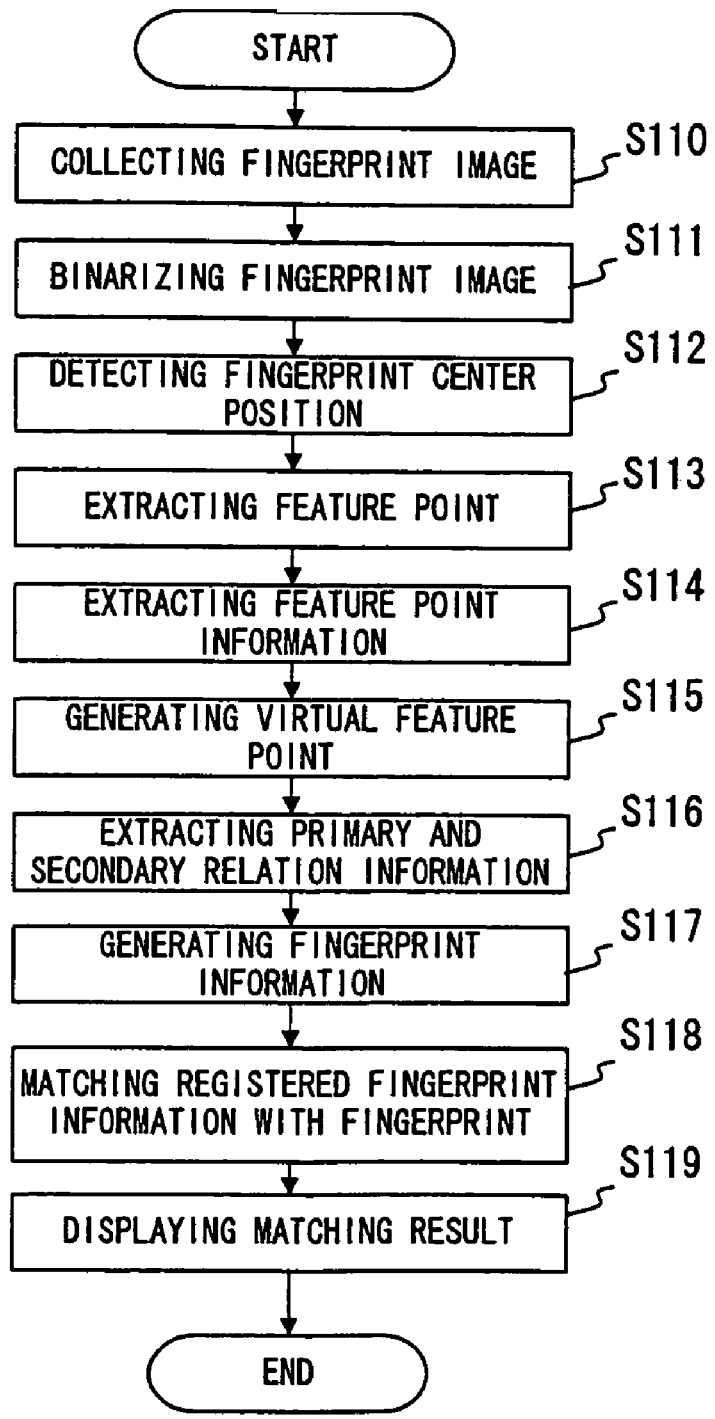
F I G. 3 0

APPARATUS AND METHOD FOR MATCHING FINGERPRINT

BACKGROUND OF THE INVENTION

1. Field of the Invention

The present invention relates to an apparatus and a method for matching a fingerprint.

2. Description of the Related Art

Recently, computers have been installed in various systems with identification equipment attracting much attention. Conventionally, an ID card or a password have been used as an authentication measure. However, they have many problems in security.

As an authentication measure more reliable than a password, a personal matching technique using biometric information has attracted much attention. When a user can be checked using biometric information unique to the user, the check result is very reliable.

One of the biometric information available in authenticating a user is a fingerprint. A fingerprint is said to have two features, that is, 'uniqueness' and 'invariability', and is an expected authentication measure. Some research and development have been performed on a personal matching system using a fingerprint these days.

The biometric information to be used in authenticating a user can be a fingerprint, a voiceprint, an iris, a vein network on the retina, a signature, etc. They can be measured by various sensors such as a CCD camera, etc., and converted into electronic information such as an image, etc. Then, various information processes are performed on the biometric information obtained by a sensor, and the information for identifying a user is extracted from biometric information. A user can be authenticated by matching the biometric key information with preliminarily registered biometric key information about each user.

A fingerprint can be considered as practical biometric information.

The surface of a person's finger is not smooth. Raised lines are called ridges. Ridges form various patterns unique to a person. Ridges have bifurcation points and ending points. Since each person has his or her own distribution of bifurcation points and ending points, these points are referred to as feature points of a fingerprints. The distribution of feature points are used as an important measure for specifying a person. When a fingerprint matching process is performed, the position, type, direction of these feature points are checked to determine whether or not a fingerprint matches a reference fingerprint.

The conventional fingerprint matching process has been performed by checking the length of ridges between feature points (refer to, for example, the Japanese Laid-Open Patent Publication No.11-195119). However, it is not sufficient in some cases to check only the lengths of ridges. Therefore, it is expected to improve the performance of the fingerprint matching process. In the previous method, the data of the lengths of ridges is stored as a part of fingerprint data, but is hard to be stored efficiently. That is, the size of the fingerprint data tends to be larger.

SUMMARY OF THE INVENTION

The present invention aims at providing a high-reliable fingerprint matching apparatus and method.

The apparatus according to the first aspect of the present invention is an apparatus for comparing an obtained first fingerprint with a preliminarily registered second fingerprint, and determining whether of not they match each other. The apparatus includes: a ridge relation obtaining unit for obtaining the relation of the ridge containing a vicinal feature point near the feature point to be checked in a matching process performed on the first and the second fingerprints to the ridge containing the feature point to be checked in the matching process; and a matching unit for performing the matching process by searching the second fingerprint containing the vicinal feature point near the feature point to be checked in the matching process for the relation of the ridge containing the vicinal feature point to the ridge containing the feature point in the first feature point to be checked in the matching process.

The apparatus according to the second aspect of the present invention is an apparatus for comparing an obtained first fingerprint with a preliminarily registered second fingerprint, and determining whether or not they match each other. The apparatus includes: a virtual feature point generation unit for generating a virtual feature point by referring to the first and the second feature points; a ridge relation obtaining unit for obtaining the relation of the ridge containing a virtual vicinal feature point near the feature point to be checked in a matching process performed on the first and the second fingerprints to the ridge containing the feature point to be checked in the matching process; and a matching unit for performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process.

The apparatus according to the third aspect of the present invention is an apparatus for comparing an obtained first fingerprint with a preliminarily registered second fingerprint, and determining whether or not they match each other. The apparatus includes: a virtual feature point generation unit for generating a virtual feature point by referring to the first and the second feature points; a ridge relation obtaining unit for obtaining the relations of the ridge containing a vicinal feature point near the feature point, and the ridge containing a virtual vicinal point to be checked in a matching process performed on the first and the second fingerprints to the ridge containing the feature point to be checked in the matching process; and a matching unit for performing the matching process by searching the second fingerprint containing the vicinal feature point near the feature point to be checked in the matching process for the relation of the ridge containing the vicinal feature point to the ridge containing the feature point in the first feature point to be checked in the matching process, and for performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process, thereby determining whether or not the feature point to be checked is matching.

The method according to the first aspect of the present invention is a method for comparing an obtained first fingerprint with a preliminarily registered second fingerprint, and determining whether or not they match each other. The method includes the steps of: (a) obtaining the relation of the ridge containing a vicinal feature point near the feature point to be checked in a matching process performed on the first and the second fingerprints to the ridge containing the feature point to be checked in the matching process;

and (b) performing the matching process by searching the second fingerprint containing the vicinal feature point near the feature point to be checked in the matching process for the relation of the ridge containing the vicinal feature point to the ridge containing the feature point in the first feature point to be checked in the matching process.

The method according to the second aspect of the present invention is a method for comparing an obtained first fingerprint with a preliminarily registered second fingerprint, and determining whether or not they match each other. The method includes the steps of: (a) generating a virtual feature point by referring to the first and the second feature points; (b) obtaining the relation of the ridge containing a virtual vicinal feature point near the feature point to be checked in a matching process performed on the first and the second fingerprints to the ridge containing the feature point to be checked in the matching process; and (c) performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process.

The method according to the third aspect of the present invention is a method for comparing an obtained first fingerprint with a preliminarily registered second fingerprint, and determining whether or not they match each other. The method includes: (a) generating a virtual feature point by referring to the first and the second feature points; (b) obtaining the relations of the ridge containing a vicinal feature point near the feature point, and the ridge containing a virtual vicinal point to be checked in a matching process performed on the first and the second fingerprints to the ridge containing the feature point to be checked in the matching process; and (c) performing the matching process by searching the second fingerprint containing the vicinal feature point near the feature point to be checked in the matching process for the relation of the ridge containing the vicinal feature point to the ridge containing the feature point in the first feature point to be checked in the matching process, and performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process, thereby determining whether or not the feature point to be checked is matching.

According to the present invention, a matching process is performed on a vicinal feature point near the feature point to be checked including the relation of the ridge containing the feature point to be checked. Therefore, fingerprints can be compared with high precision, which cannot be attained in a matching process performed only by comparing the position, the direction, and the type of the vicinal feature point with those of the feature point to be checked.

In addition, by generating a virtual feature point for comparison with the feature point to be checked, a matching process can be performed with the ridge containing a vicinal feature point near an actual feature point considered even if the actual feature point may be changed due to the pressure of a fingerprint or sweat. Therefore, the matching process can be performed with a smaller influence of a change in a feature point of a fingerprint.

Furthermore, the fingerprint matching process can be performed with a smaller influence of the distortion, defect, touching ridges, split, etc. of a fingerprint by a combination use of the relation of a ridge containing a feature point to be checked A and a virtual feature point.

BRIEF DESCRIPTION OF THE DRAWINGS

FIG. 4 shows the data structure according to the first embodiment of the present invention;

FIG. 15 shows an example of the type of data structure;

FIG. 16 shows the fourth embodiment of the present invention in which the type of a feature point has been changed;

FIG. 18 shows an example of a data structure;

FIG. 19 shows a change in type of target feature point;

FIG. 30 is a flowchart of the procedure of the operation of the apparatus shown in FIG. 29.

DESCRIPTION OF THE PREFERRED EMBODIMENTS

Figure 1:
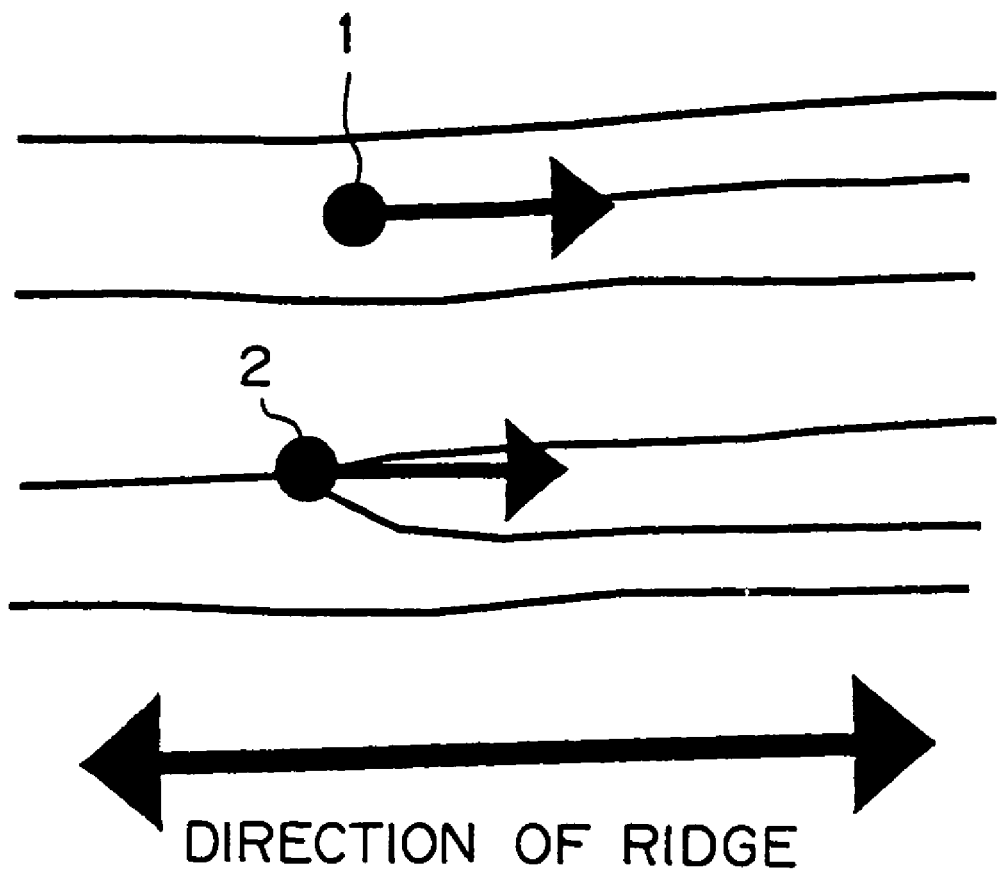
FIG. 1 shows the definition of the direction of a feature point.

According to the embodiments of the present invention, a matching process is performed on the ridges in the vicinity of the feature point to be checked by referring to the information about the connection of ridges between one feature point to be checked and another feature point, and the feature point information about feature points related by the connection of ridges.

Furthermore, according to the embodiments of the present invention, when a feature point has the information about another related feature point, the information about another feature point is managed using an identifier assigned to each feature point.

According to the embodiments of the present invention, when a feature point is checked in a matching process, the feature information about a vicinal feature point is referred to. Therefore, the feature point can be checked in the matching process with high precision. Furthermore, since it is determined whether the type of vicinal feature point refers to an ending point or a bifurcation point, a matching process can be performed with high precision when a change from an ending point to a bifurcation point has occurred, or when a change from a bifurcation point to an ending point has occurred. As a result, the performance of a matching process can be largely improved.

In addition, since the feature point information is managed using the identifier of a feature point, plural pieces of data do not coexist, and fingerprint data can be efficiently represented, thereby reducing the amount of fingerprint data.

There are ending points and bifurcation points in a ridge of a fingerprint. The distribution of ending points and bifurcation points depends on each person. Therefore, it can normally be determined whether or not two fingerprints match each other by comparing the distributions of ending points and bifurcation points between the two fingerprints. For example, when two fingerprints are compared, all feature points contained in each fingerprint are extracted, and each feature point is sequentially compared with a corresponding feature point. The feature points are compared with each other in position, type (ending point or bifurcation point), direction, etc. If they match in a predetermined range, it is determined that the corresponding feature points match each other. When two fingerprints are compared, it can be determined that the two fingerprint match each other if the ratio of the number of matching feature points to the total number of feature points exceed a predetermined value.

Conventionally, feature points are compared in position, type, and direction. However, the conventional method cannot attain sufficient matching performance, thereby requiring a furthermore strict matching condition. For example, there is a method of comparing the numbers of ridge lines, the ridge lengths between feature points, etc.

According to the embodiments of the present invention, the information about ridges is used in the matching process in addition to the position, type, and direction of a feature point. Defined below as an example is the direction of a feature point.

FIG. 1 shows the definition of the direction of a feature point.

The direction of a feature point is defined by detecting the direction of a ridge contained in the image of a fingerprint to be detected.

An example of a method for detecting the direction of a ridge can be a method of detecting the direction of a ridge in a Hough transform from a thin line image of a fingerprint obtained by thinning an input image of the fingerprint. Refer to the Image Analysis Handbook (from Tokyo University Publication) for a Hough transform on page 572 through 573. The method for detecting the direction of a ridge includes the following steps.

1) generating a thin line image of a fingerprint from an obtained image of the fingerprint.

2) dividing a thin line image of a fingerprint into block areas of a size of the width of several thin lines.

3) performing a Hough transform on each block area of a thin line image of a ridge, and extracting a linear component to obtain the local direction of the ridge of the block from the extracted linear component.

4) obtaining the global direction of the ridge by averaging the directions of the ridges of a target block and a vicinal block.

Thus, the direction of a ridge is first detected. Then, the direction of a feature point is set to be parallel to the direction of the ridge detected above regardless of an ending point and a bifurcation point. When a feature point is an ending point as indicated by 1 shown in FIG. 1, the direction of a ridge is defined as the direction of the feature point (ending point). When a feature point is a bifurcation point as indicated by 2 shown in FIG. 1, the direction of a larger number of ridges is defined as the direction of the feature point (bifurcation point).

Figure 2:
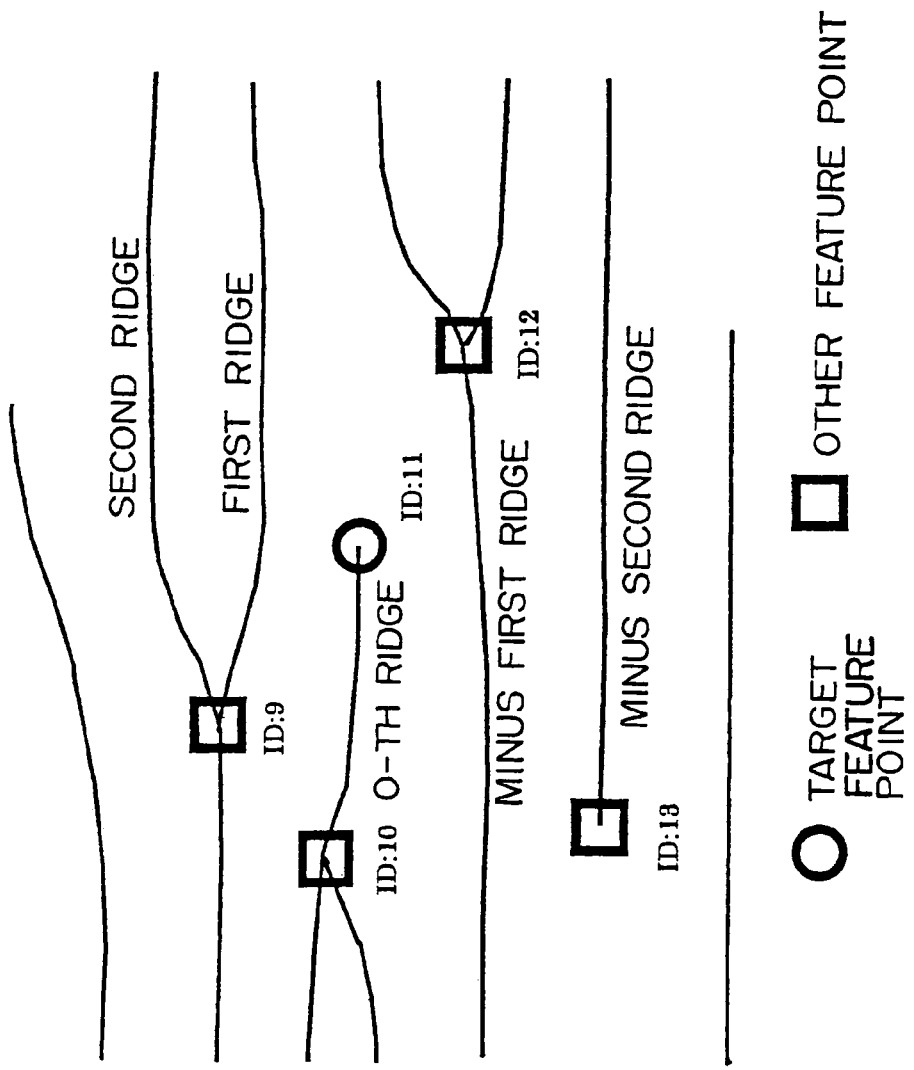
FIG. 2 shows the matching method (1) according to the first embodiment of the target feature point according to the present invention.

FIG. 2 shows the first embodiment of the feature point matching method according to the present invention.

The feature point enclosed by a circle in the center shown in FIG. 2 is a feature point to be checked in a matching process, and is hereinafter referred to as a target feature point. The feature point enclosed by a square is located near the target feature point, and is hereinafter referred to as a vicinal feature point. The ridge connected to the target feature point is referred to as the 0-th ridge, and a ridge away by n ridges are referred to as the n-th ridge and the -n-th ridge (n is a natural number, a sign indicates specified directions. In FIG. 2, the upward direction is set as the positive direction).

A target feature point has the information about a vicinal feature point connected to the m-th ridge (m is an integer). A matching process of the target feature point is performed by determining whether the vicinal feature points match. Since a matching process of the target feature point is performed by matching the vicinal feature points, the ridge structure in the vicinity of the target feature point is also checked in the matching process. Hereinafter, the feature point connected to the m-th ridge is referred to as the m-th primary related feature point. A combination of the m-th ridge and them-th primary related feature point is hereinafter referred to as relation information.

The words 'matching' and 'coincident' appear in the following descriptions. They refer to "matching" in a predetermined range.

Figure 3:
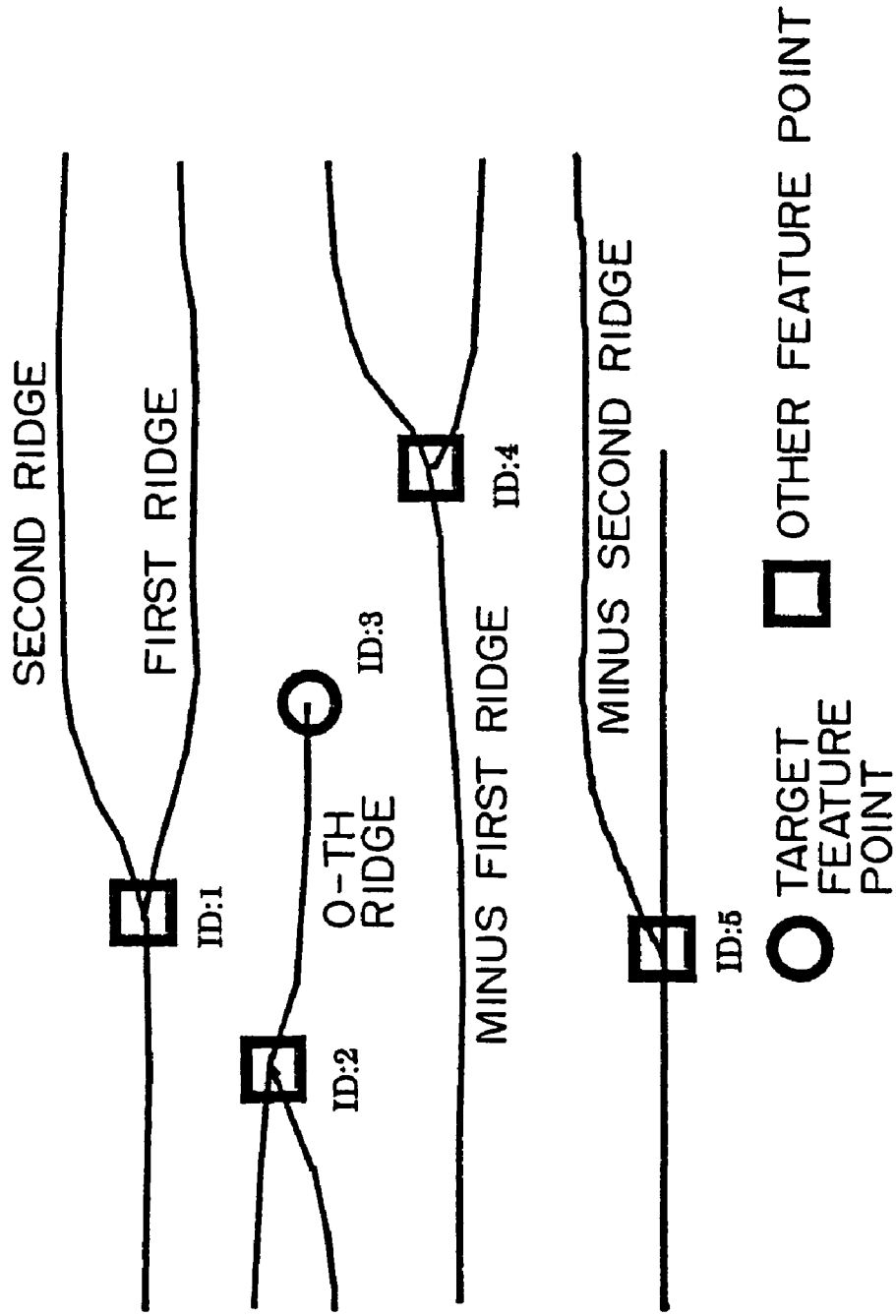
FIG. 3 shows the matching method (2) according to the first embodiment of the target feature point according to the present invention.

FIGS. 2 and 3 show the method of performing the matching process according to the first embodiment of the present invention.

Assume that FIG. 2 shows a preliminarily registered fingerprint, and FIG. 3 shows a fingerprint to be checked in the matching process.

First, according to the present embodiment, the feature point of an input fingerprint matching each feature point of a registered fingerprint is searched for in probable combinations of feature points. Among the probable combinations, the combination marking the highest point is assumed to be the matching feature points. This process is performed conventionally. According to the present embodiment, the following method is furthermore adopted. Also in the embodiments described later, it is assumed that the conventional matching feature point searching process is adopted. However, the present invention is not limited to the combination of a present method with the conventional matching feature point searching method.

In the feature point matching method according to the present embodiment, the feature point information about the m-th primary related feature point is assigned to each feature point. For example, FIG. 4 shows the data structure containing feature point information. In FIG. 2, the data corresponding to the target feature point ID 11 contains the information about the following feature points ID 9 through ID 13.

position of feature point
type of feature point (terminal point or bifurcation point)
direction of feature point
The 0-th ridge is connected to the feature point ID 10.
The first ridge is connected to the feature point ID 9.
The second ridge is connected to the feature point ID 9.
The minus first ridge is connected to the feature point ID 12.
The minus second ridge is connected to the feature point ID 13.

Thus, the data of one feature point contains the information about the ridges connected to the feature point in addition to the information about the feature point itself. In addition, each feature point is managed by an identifier. If the information about, for example, the feature points ID 9 and ID 10 are required when the feature point ID 11 is checked, then data is retrieved using the ID 9 and the ID 10 as keys, and the entries of the feature points ID 9 and ID 10 are searched for. From the retrieved data, the information about the position, type, method, etc. of the feature points ID 9 and ID 10 is extracted. For example, the information can be as follows.

The feature point ID 9 is a bifurcation point (type) having the coordinate (100, 150), and is headed right.

The feature point ID 10 is a bifurcation point (type) having the coordinate (90, 160), and is headed left.

Similarly, the data corresponding to the target feature point shown in FIG. 3 contains the information about the feature points ID 1 through ID 5, and the feature point information about them.

position of feature point
type of feature point
direction of feature point The 0-th ridge is connected to the feature point ID 2.
The first ridge is connected to the feature point ID 1.
The second ridge is connected to the feature point ID 1.
The minus first ridge is connected to the feature point ID 4.
The minus second ridge is connected to the feature point ID 5.

The target feature point shown in FIG. 2 and the target feature point shown in FIG. 3 are matched as follows.

First, the 0-th primary related feature points are matched. That is, if other feature points (ID 10 shown in FIG. 2 and ID 2 shown in FIG. 3) connected to the 0-th ridges match each other, the relation between the target feature points shown in FIGS. 2 and 3 is defined as 'matching'.

The feature point ID 10 shown in FIG. 2 and the feature point ID 2 shown in FIG. 3 can be matched in the conventional matching method. For example, if they match each other in position, type, and direction in the range of a predetermined value, then they are assumed to be the same feature points.

Similarly, the matching process is performed on the first, second, minus first, and minus second ridges. The n-th ridges for the target feature points shown in FIGS. 2 and 3 are matched as follows.

The ridge structures of the second ridges match. (The ID 9 shown in FIG. 2 is the same feature point as the ID 1 shown in FIG. 3.)

The ridge structures of the first ridges match. (The ID 9 shown in FIG. 2 is the same feature point as the ID 1 shown in FIG. 3.)

The ridge structures of the 0-th ridges match. (The ID 10 shown in FIG. 2 is the same feature point as the ID 2 shown in FIG. 3.)

The ridge structures of the minus first ridges match. (The ID 12 shown in FIG. 2 is the same feature point as the ID 4 shown in FIG. 3.)

The ridge structures of the minus second ridges match. (The ID 13 shown in FIG. 2 is the same feature point as the ID 5 shown in FIG. 3.)

Finally, considering all matching states of the ridge structures, it is determined whether or not the target feature point of the registered fingerprint matches the target feature point of the input fingerprint.

The determining method can be, for example, a point marking method. In matching the ridge structures, the ridges from the minus second ridges to the second ridges are matched respectively. If two corresponding ridge structures match each other, one point is marked. For example, if a total of 3 or more points are marked, then the target feature points are defined as 'matching'.

Thus, the relation information about the feature points is checked for each feature point. Finally, a total number of feature points is counted. If the ratio of the number of matching feature points exceeds a predetermined value, if the number of matching feature points is larger than a predetermined value, or if the total mark of all matching feature points exceeds a predetermined value in the feature points contained in the fingerprints, then it is determined that the fingerprints match each other.

In the above mentioned embodiment, although only one n-th (n is a positive number other than 0) ridge primary related feature point is selected for each ridge, each n-th ridge has feature points at both ends. Therefore, the relation information about two primary related feature points can be recorded.

FIG. 2 shows the case containing a target feature point as an ending point. However, the similar matching process is performed on a bifurcation point. In the case of a bifurcation point, there are a total of 3 feature points connected to the 0-th ridges. When the 0-th ridges are matched, all corresponding feature points connected to the 0-th ridges are matched in all combinations, and the highest mark is defined as the final mark of the feature point.

Figure 5:
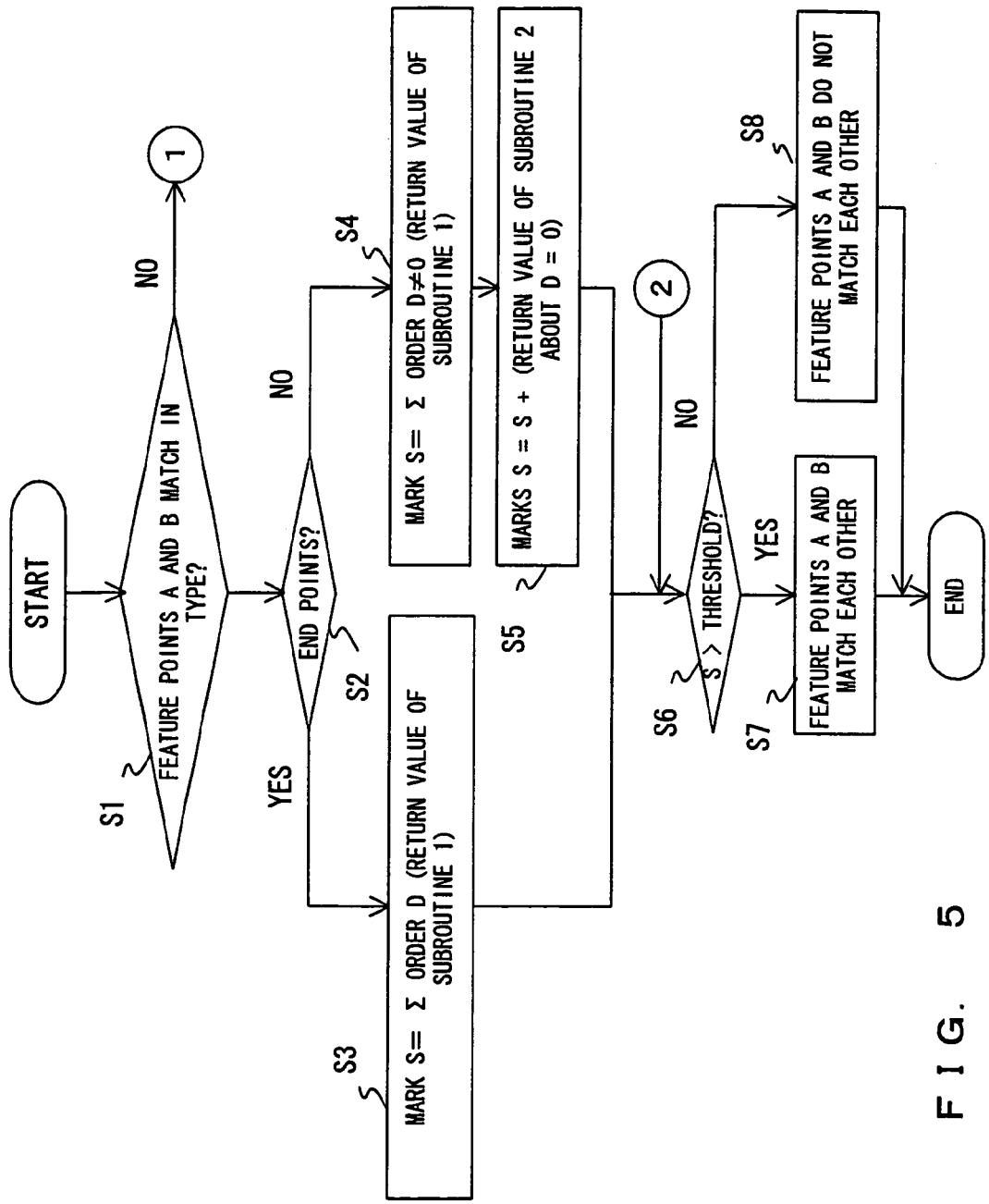
FIG. 5 is a flowchart (1) of the process according to the first embodiment of the present invention.
Figure 8:
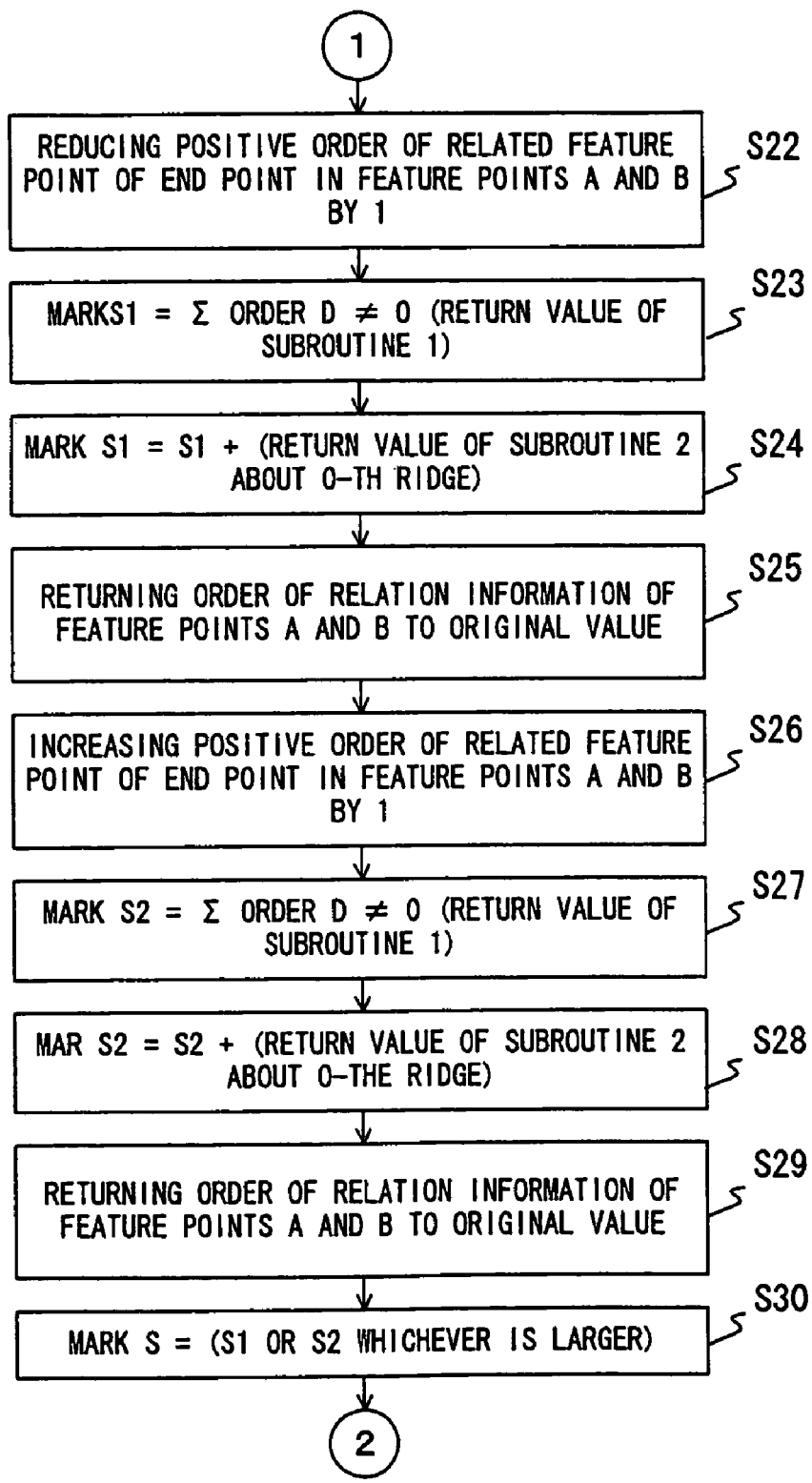
FIG. 8 is a flowchart (4) of the process according to the first embodiment of the present invention.

FIGS. 5 and 8 are flowcharts of the process according to the first embodiment.

A subroutine 1 matches the related feature points in the D-th ridges of the two feature points to be matched, and computes a total mark A subroutine 2 computes a total mark of the 0-th ridge when a feature point to be checked is a bifurcation point. When the feature point is a bifurcation point, there are three 0-th ridges. Therefore, when the matching process is performed, there are a total of six combinations of the 0-th ridges of the feature points to be matched. For example, assuming that the 0-th ridges of the registered fingerprint are A, B, and C, and the 0-th ridges of the input fingerprint are P, Q, and R, the following combinations can be obtained.

(A-P, B-Q, C-R), (A-P, B-R, C-Q)
(A-Q, B-P, C-R), (A-Q, B-R, C-P)
(A-R, B-P, C-Q), (A-R, B-Q, C-P)

The total mark is computed for each combination, and the largest value of the computed points is defined as the total mark of the 0-th ridge. The subroutine 2 indicates the computation procedure.

In FIG. 5, it is determined in step S1 whether or not the feature points A and B, which are target feature points, are of the same type. If they are not of the same type, control is passed to the flowchart shown in FIG. 8. When they are of the same type, control is passed to step S2. It is determined in step S2 whether or not type of the feature points A and B is an ending point. In step S3, if the type of the feature points A and B is an ending point, then the return values of the subroutine 1 are added up, the total mark is computed, and control is passed to step S6. If it is determined in step S2 that the type of the feature points A and B is not an ending point, then the return values of the subroutine 1 are added up for the ridges other than the 0-th ridges in step S4. The mark is computed by the subroutine 2 for the 0-th ridges in step S5, and the result is added to the mark obtained in step S4 to obtain the total mark. Then, it is determined whether or not the total mark is larger than a threshold in step S6. If it is larger than the threshold, then A it is determined in step S7 that the feature points A and B match each other. If the total mark is equal to or smaller than the threshold, then it is determined in step S8 that the feature points A and B do not match each other.

Figure 6:
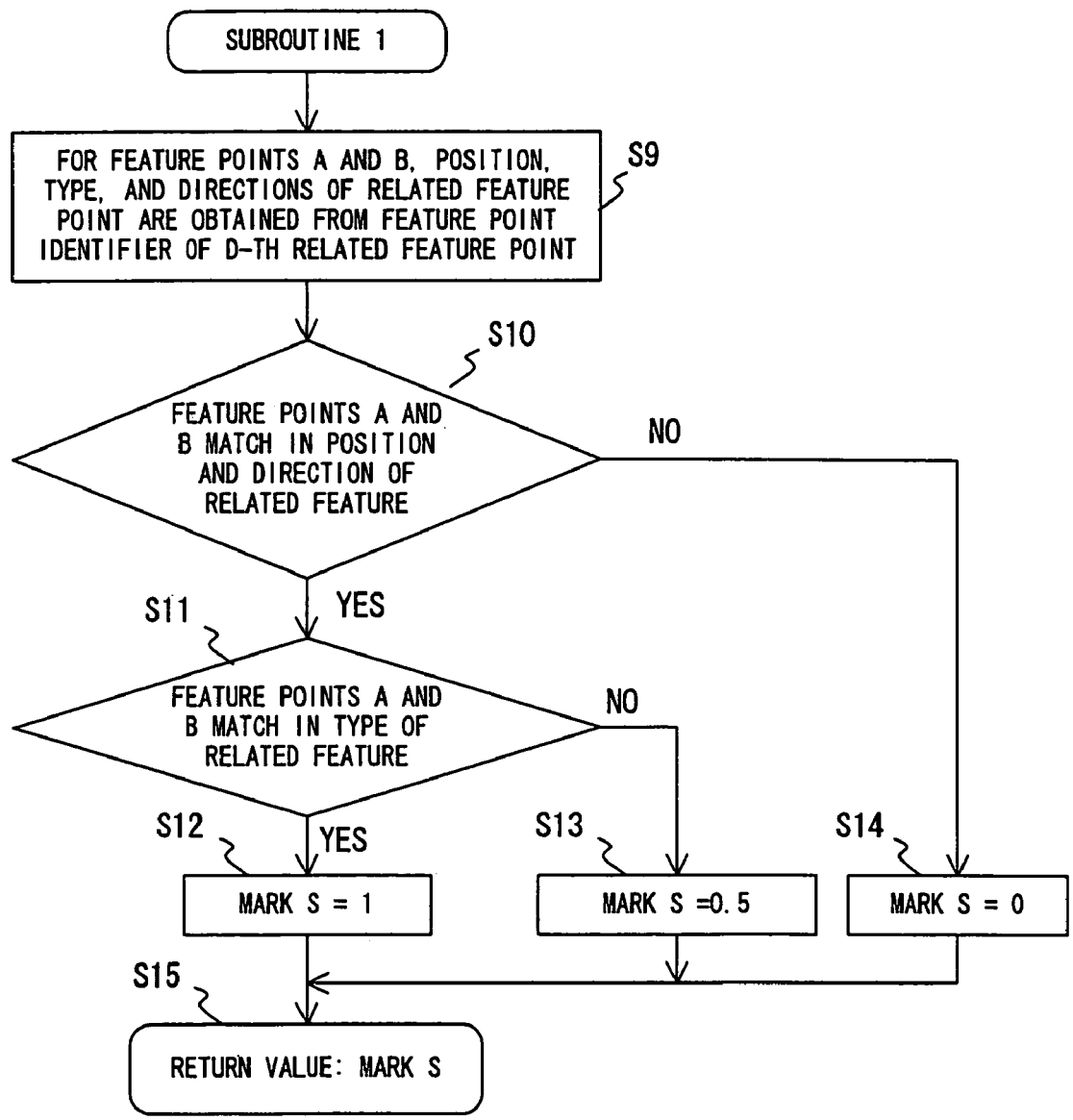
FIG. 6 is a flowchart (2) of the process according to the first embodiment of the present invention.

FIG. 6 is a flowchart of the process performed by the subroutine 1 invoked in the process shown in FIG. 5.

When the subroutine 1 is invoked, the positions, types, and directions of the related feature points are obtained from the feature point identifiers of the D-th related feature points for the feature points A and B in step S9. It is determined in step S10 whether or not the positions and directions of the related feature points of the feature points A and B match each other. If they do not match, the mark is set to 0 in step S14. If the determination result is YES in step S10, then it is determined in step S11 whether or not the types of the related feature points of the feature points A and B match each other. If it is determined in step S11 that the types do not match, then the mark is set to 0.5 in step S13. If it is determined in step S11 that the types match each other, the mark is set to 1 in step S12. Then, the mark is defined as a return value, and control is returned to the flowchart shown in FIG. 5 in step S15.

The mark is set to 0.5 when the types do not match each other because it is considered that the type of a feature point depends on the pressure of the finger onto the sensor when a fingerprint is taken for entry and when the fingerprint is input for a matching process, thereby obtaining a matching result from the fingerprints matching in position and direction, and not matching in type by setting 0.5.

Figure 7:
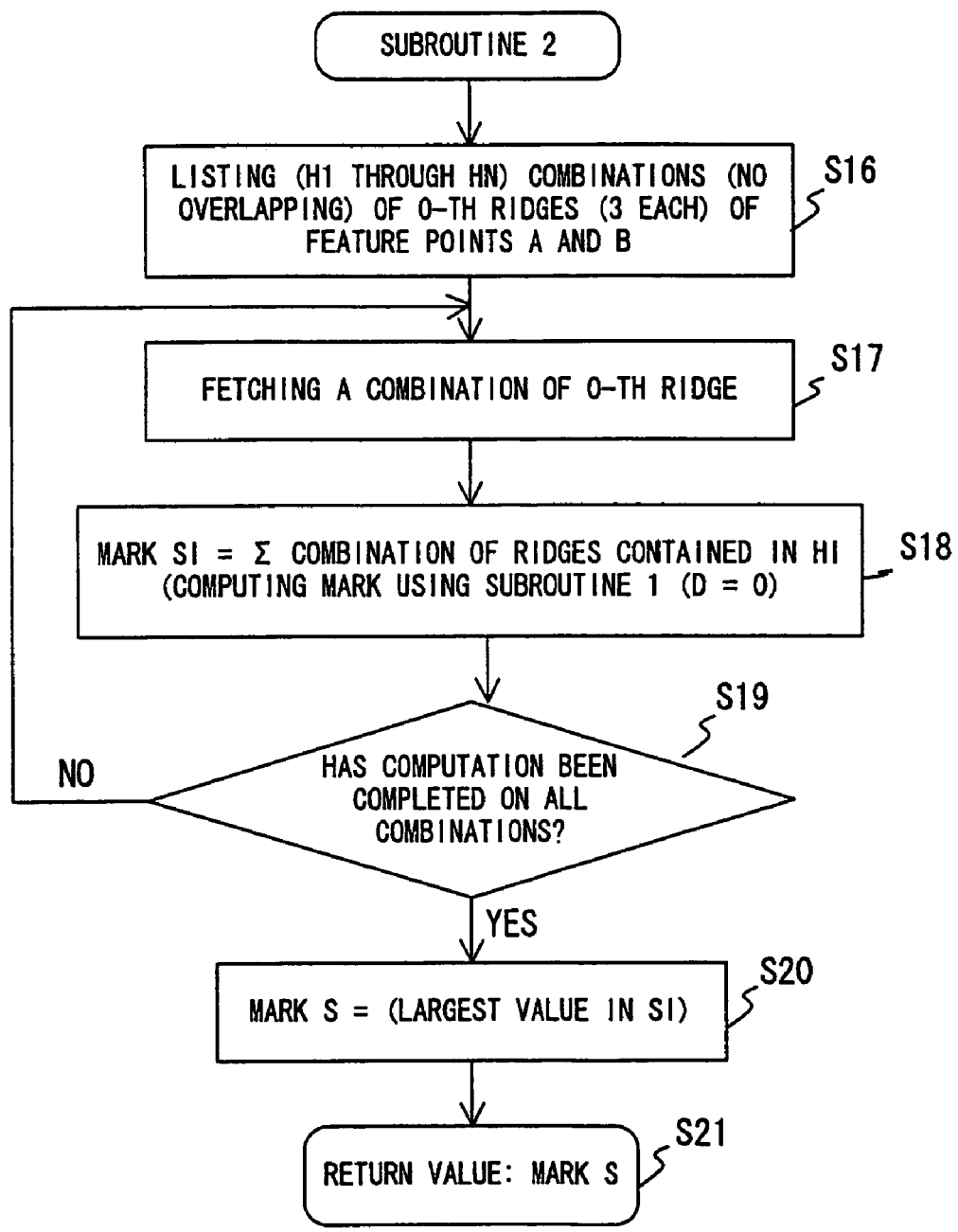
FIG. 7 is a flowchart (3) of the process according to the first embodiment of the present invention.

FIG. 7 is a flowchart of the process performed by the subroutine 2 invoked in the process shown in FIG. 5.

In step S16, the combinations (no overlapping) of the 0-th ridges (3 ridges for each feature point) (the subroutine 2 is invoked when the feature point is a bifurcation point) of the feature points A and B are listed. In this example, the combinations of the 0-th ridges are referred to as H1 through Hn. Then, in step S17, a combination H1 of the 0-th ridges is retrieved. In step S18, the mark is computed by the subroutine 1 where D=0 as shown in FIG. 6. In step S19, it is determined whether or not the computation has been performed on all combinations. If the computation has not been performed on all combinations, control is passed to step S17, and the process is repeated. If it is determined in step S19 that the computation has been performed on all combinations of the 0-th ridges, then control is passed to step S20, and the largest value is defined as the mark S in the computed marks Si of the plural combinations of the 0-th ridges. Then, in step S21, control is returned with the return value S to the process shown in FIG. 5.

FIG. 8 is a flowchart of the process performed after a branch in step S1 in the process shown in FIG. 5.

When it is determined in step S1 shown in FIG. 5 that the types of the feature points A and B do not match each other, control is passed to step S22 shown in FIG. 8. In step S22, the positive orders of the related feature points on the ending points of the feature points A and B are lowered by 1. This indicates that the ridges of each order is affected when a feature point is converted from an ending point to a bifurcation point, and from a bifurcation point to an ending point. The detail explanation is described later. Then, in step S23, the marks S1 for the ridges other than the 0-th ridges are computed by the subroutine 1 shown in FIG. 6. Then, in step S24, the marks are computed for the 0-th ridges by the subroutine 2 shown in FIG. 7, and the results are added to the marks obtained in step S23. In step S25, the order of the relation information of the feature points A and B are returned to the original values. Then, in step S26, the negative orders of the related feature points of the ending points in the feature points A and B are increased by 1. Then, in step S27, the marks for the ridges other than the 0-th ridges are computed by the subroutine 1 shown in FIG. 6. Then, in step S28, the marks are computed for the 0-th ridges by the subroutine 2 shown in FIG. 7, and the results are added to the marks computed in step S28 to obtain the total mark S2. In step S29, the orders of the relation information about the feature points A and B are returned to the original values. In step S30, the value of S1 or S2, whichever is larger, is set as the mark S, and control is passed to step S6 shown in FIG. 5.

Figure 9:
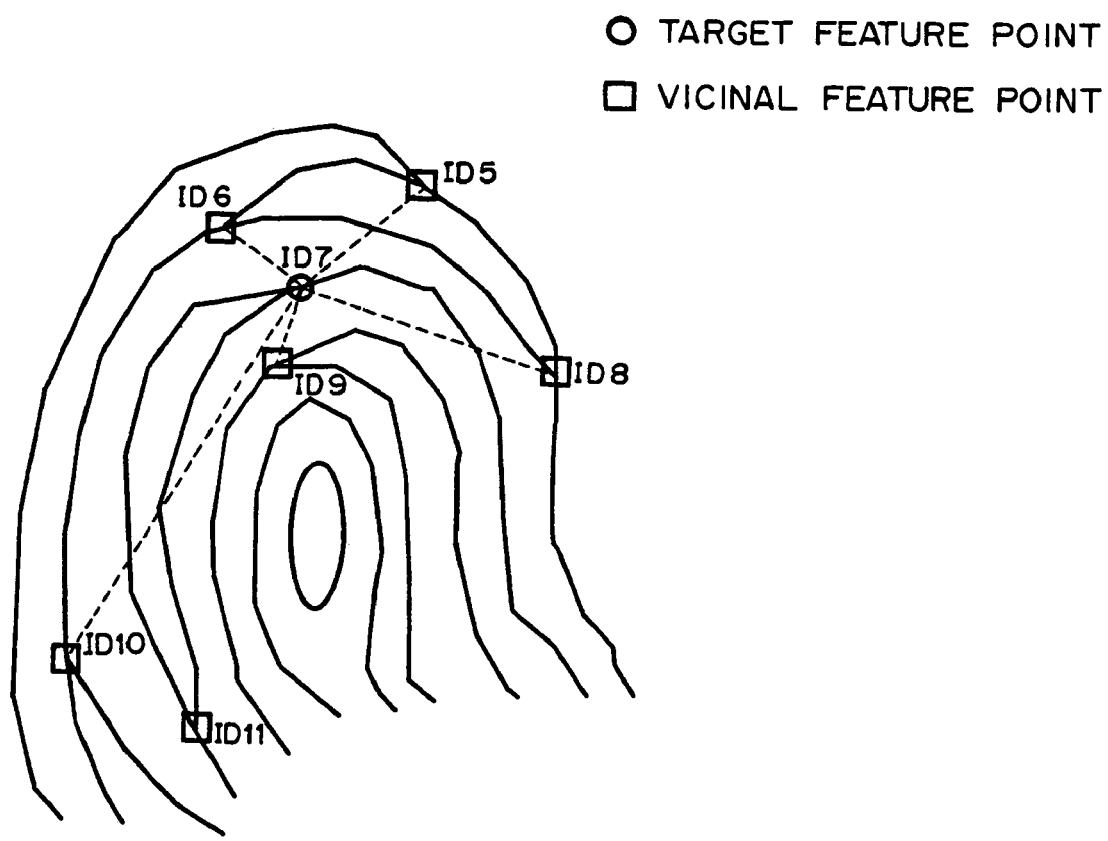
FIG. 9 shows the second embodiment (1) of the feature point matching method according to the present invention.
Figure 10:
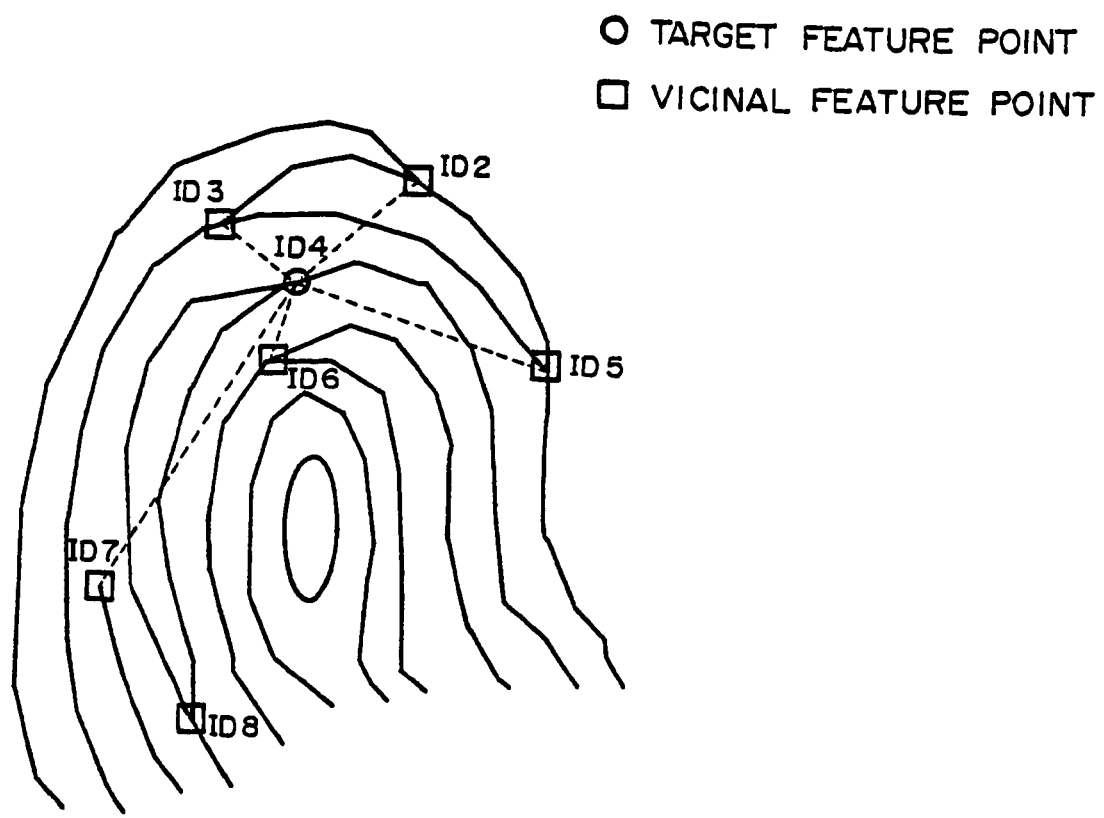
FIG. 10 shows the second embodiment (2) of the feature point matching method according to the present invention.

FIGS. 9 and 10 show the second embodiment of the feature point matching method according to the present invention.

FIG. 9 shows a preliminarily registered fingerprint, and FIG. 10 shows a fingerprint to be checked.

According to the second embodiment, the data of the number of ridges is added to the first embodiment. Described below is the feature point matching method using the data of the number of ridges.

As in the first feature point matching method, the matching process on the target feature point ID 7 shown in FIG. 9 is performed using a vicinal feature point. When the number of ridges between a target feature point and a vicinal feature point is n, the vicinal feature point is hereinafter referred to as an n-th vicinal feature point (n is an integer equal to or larger than 0).

A target feature point has information about the n-th vicinal feature point. The target feature point is matched with the n-th vicinal feature point to determine whether or not they match each other. Since the target feature point is matched against the n-th vicinal feature point, the matching process on the target feature point is to check the ridge structure around the target feature point.

A target feature point has the information about the number of ridges to a vicinal feature point and the feature point information about the vicinal feature point. For example, in FIG. 9, the target feature point ID 7 has the following n-th vicinal feature point information.

The 0-th vicinal feature points are ID 6 and ID 9.
The first vicinal feature points are ID 5 and ID 8.
The second vicinal feature point is ID 10.

Together with the above mentioned information, the feature point information about the feature point of each identifier is stored. Examples are shown below.

The feature point of the ID 9 is a bifurcation point (type), has the coordinate (100, 150), and is headed right.

The feature point of the ID 10 is a bifurcation point (type), has the coordinate (90, 180), and is headed down.

A target feature point is matched with each vicinal feature point.

First, the 0-th vicinal feature points are checked. The 0-th vicinal feature points are ID 3 and ID 6 in FIG. 10. Since the registered fingerprint and the input fingerprint have respective 0-th vicinal feature points, there are several combinations of the 0-th vicinal feature points to be checked. Therefore, the matching process is performed on all combinations.

The combinations are listed below.

1. (matching the feature point ID 6 shown in FIG. 9 with the feature point ID 3 shown in FIG. 10) and (matching the feature point ID 9 shown in FIG. 9 with the feature point ID 6 shown in FIG. 10)

2. (matching the feature point ID 6 shown in FIG. 9 with the feature point ID 6 shown in FIG. 10) and (matching the feature point ID 9 shown in FIG. 9 with the feature point ID 3 shown in FIG. 10)

The feature point matching process is performed as in the first feature point matching method. That is, the feature points are defined as 'matching' if they match in position, type, and direction within the range of a predetermined value. When a couple of vicinal feature points match each other as in the first matching method, one point is marked. In the combinations 1 and 2 above, the mark of whichever is higher is defined as the matching mark of the 0-th ridge structure.

Similarly, the matching process is performed on the n-th vicinal feature point. When there are a plurality of combinations to be checked, the matching marks are computed for all combinations, and the largest value is defined as the matching mark of the n-th vicinal feature point.

It is determined whether or not target feature points match each other by total marks as in the first matching method.

According to the second embodiment, the feature point matching process is performed also using the number of ridges. The second embodiment is realized by combining the feature point matching method based on the number of ridges with the first matching method. When the n-th related (vicinal) feature point matching process is performed, the feature points are matched with each other in each method. If a matching result is output in either of the methods, it is determined that the ridge structures of the n-th ridges match each other. Although one piece of the relation information to the two vicinal feature points cannot be detected, the feature point matching process can be successfully performed. This is effective when the ridge structure of a fingerprint cannot be partially detected.

Figure 11:
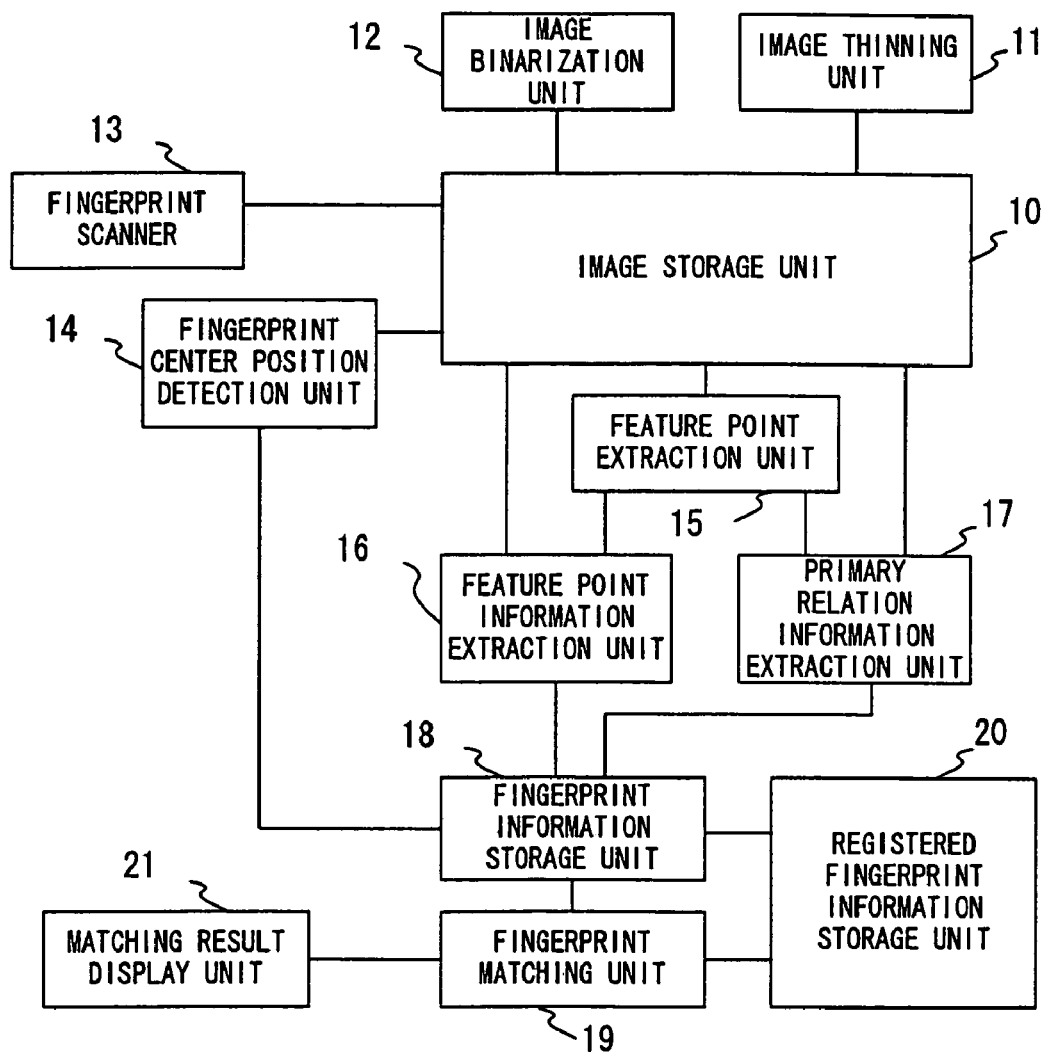
FIG. 11 is a block diagram of the functions of the apparatus for realizing the first and second embodiments of the fingerprint matching method.

FIG. 11 is a block diagram of the functions of the apparatus for realizing the first and second embodiments of the fingerprint matching method.

A fingerprint scanner 13 is a fingerprint input device for measuring the pattern of a fingerprint as an image. An image storage unit 10 is a storage device for storing a fingerprint image being treated in an image process. An image binarization unit 12 converts a multivalue intensity level fingerprint image into a binary intensity level fingerprint image, and is well-known by one of ordinary skill in the art. An image thinning unit 11 extracts the core line of a ridge from the binarized fingerprint image. A feature point extraction unit 15 extracts a fingerprint feature point from a thinned fingerprint image. A feature point information extraction unit 16 detects each piece of feature point information (position, type, and direction) about a feature point from a thinned image, and the direction of a feature point is detected based on the definition described by referring to FIG. 1. A primary relation information extraction unit 17 extracts the primary related feature point of each feature point from a thinned image. A fingerprint center position detection unit 14 detects the center position of a fingerprint. A fingerprint information storage unit 18 stores the obtained feature point information, the relation information, and the fingerprint center position as one piece of fingerprint information. A registered fingerprint information storage unit 20 stores preliminarily registered fingerprint information as a database. A fingerprint matching unit 19 checks two pieces of fingerprint information, and determines whether or not they match each other. A matching result display unit 21 displays a matching result.

Each of the above mentioned units is described below in detail in order of operation procedure.

Figure 12:
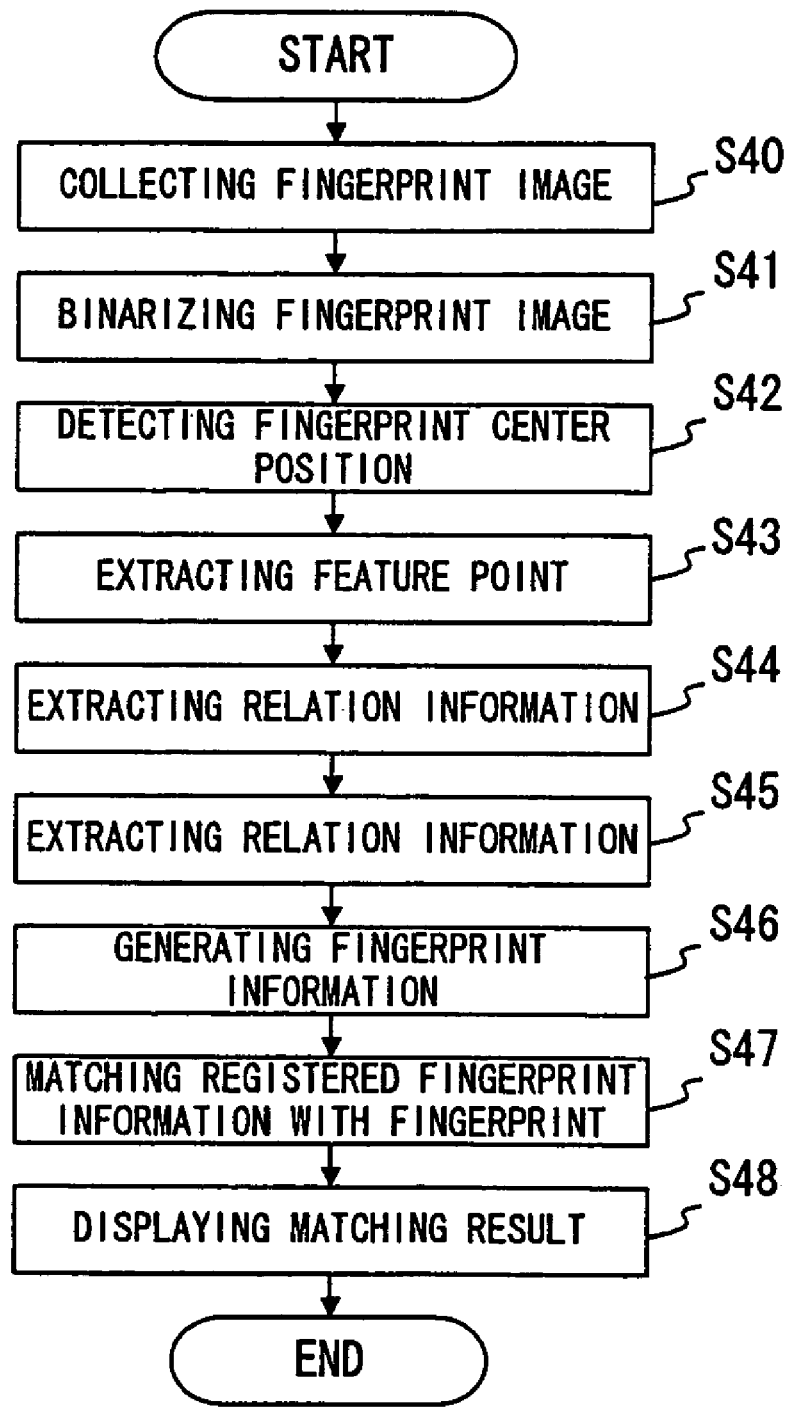
FIG. 12 is a flowchart of the procedure of operating the apparatus shown in FIG. 11.

FIG. 12 is a flowchart of the operation procedure of the apparatus shown in FIG. 11.

First, the fingerprint scanner 13 collects a multivalue fingerprint image (step S40). The collected multivalue fingerprint image is stored in the image storage unit 10. The image binarization unit 12 binarizes the multivalue fingerprint image (step S41), and stores it in the image storage unit 10 again. The image thinning unit 11 performs a thinning process to obtain the core line of a fingerprint ridge from the binarized fingerprint image. The thinned fingerprint image is stored in the image storage unit 10 again. The fingerprint center position detection unit 14 detects the center of the fingerprint from the multivalue image, the binarized image, etc. (step S42). The method of detecting a fingerprint center can be any of various well-known conventional methods.

The feature point extraction unit 15 extracts the feature point position of the fingerprint from the thinned fingerprint image (step S43). The feature point information extraction unit 16 detects the feature point information about the position, the type, and the direction of the feature point from the feature point position and the thinned image (step S44). The primary relation information extraction unit 17 extracts a primary related feature point from the feature point position and the thinned image, and the relation information is detected (step S45).

The fingerprint information storage unit 18 obtains one piece of fingerprint information from the collected fingerprint center position, the feature point information, and the primary relation information, and stores the fingerprint information (step S46). The registered fingerprint information storage unit 20 stores a database in which preliminarily measured fingerprint information is registered.

The fingerprint matching unit 19 matches the generated fingerprint information with the preliminarily registered specific fingerprint information (step S47). It is determined whether or not the fingerprints match each other by matching corresponding feature points as described above.

Described below in detail is the matching procedure. Hereinafter, the registered fingerprint information is referred to a registered fingerprint, and the fingerprint to be checked whether or not it matches the registered fingerprint is referred to as an input fingerprint.

First, the registered fingerprint and a fingerprint to be checked are aligned. The position of the fingerprint image depends on each case of taking a fingerprint image. Therefore, the feature point positions cannot be checked unless a common coordinate axis can be set between the registered fingerprint and the input fingerprint. As a common coordinate axis, for example, a coordinate axis having the center of a fingerprint as an origin is set. Otherwise, a common coordinate axis can be set by defining a specified feature point as an origin.

Then, the matching process is performed according to the first embodiment of the above mentioned feature point matching method on each feature point.

The feature point matching process is performed on all combinations of feature points between a registered fingerprint and an feature point information. The procedure of the feature point matching process is described below.

Step 1

A combination of a feature point of the registered fingerprint and a feature point of the input fingerprint is selected.

Step 2

When the feature point coordinates of the registered fingerprint and the feature point coordinates of the input fingerprint do not match within a predetermined range, it is determined that the two feature points do not match, and control is returned to step 1.

Step 3

A combination of two feature points are checked in the above mentioned first feature point matching method, and a matching mark is computed. When the matching mark exceeds a predetermined value, it is determined that the feature points match each other. Then, control is returned to step S1, and a feature point matching process is performed on another combination of feature points. When matching feature points are detected, they are not checked again in the matching process.

In the above mentioned procedure, all feature points are checked whether or not matching feature points exist. When the number of matching feature points finally exceeds a predetermined value, it is determined that the registered fingerprint matches the input fingerprint. In addition, the method of determining matching fingerprints can be to determine them when the ratio of the number of feature points determined as matching each other to the total number of feature points exceeds a predetermined value, or when the total score of feature point matching scores exceeds a predetermined value.

Then, in step S48, the matching result is displayed, and the process terminates.

Then, according to the third embodiment of the feature point matching method, the matching process is performed using a virtual feature point. The basic matching method is the same as the first embodiment of the feature point matching method.

Before collecting the relation information about a target feature point, a virtual feature point is set on an fingerprint image. In this example, it is defined that the virtual feature point is the position from which an existing feature point is projected onto adjacent ridges. The projecting method can be to define as a virtual feature point the crossing point of the line vertical to a ridge from a feature point and the adjacent ridge. However, it is not necessary to always draw a line vertical to the ridge, but a diagonal line will do. Otherwise, in quite a different method, a virtual feature point can be set on the adjacent ridge. That is, a corresponding virtual feature point can be provided in the adjacent ridge.

Figure 13:
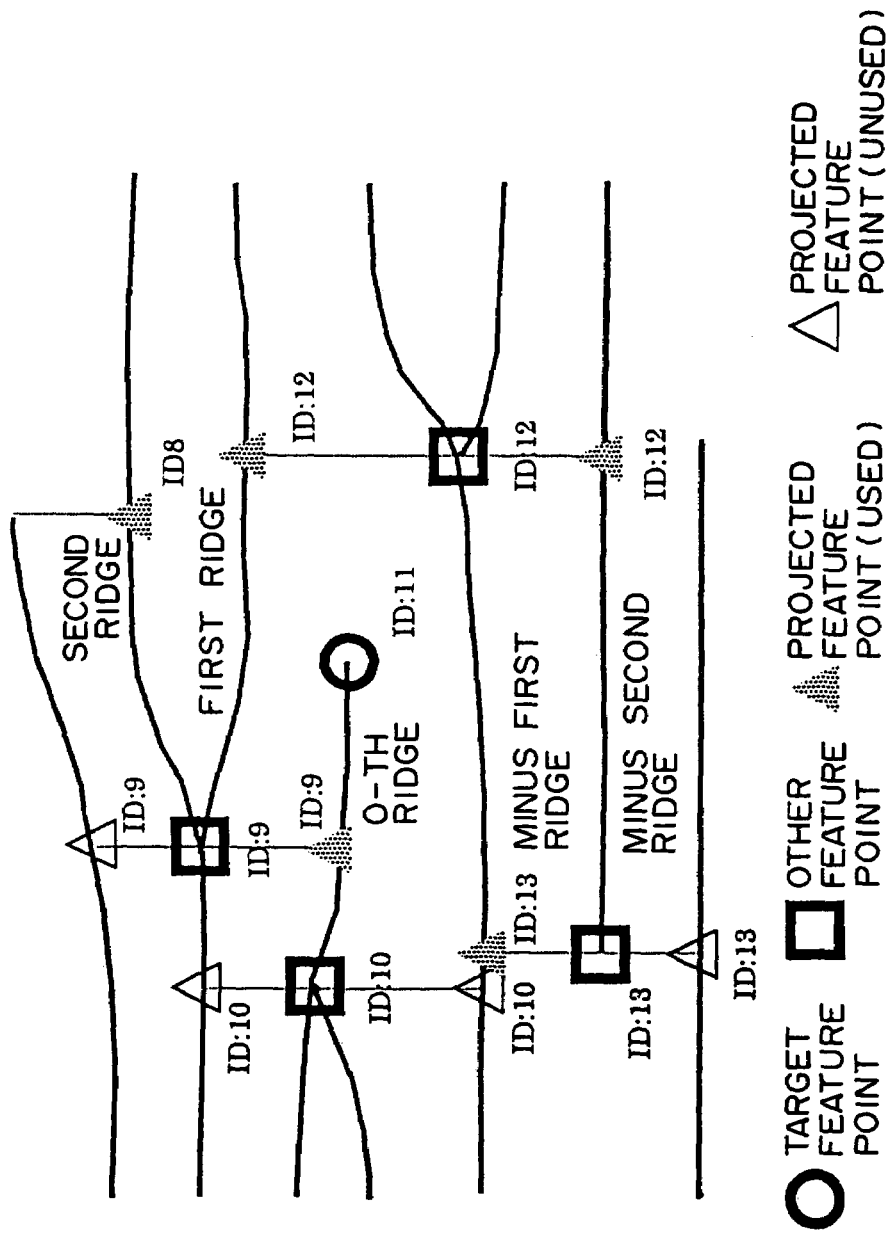
FIG. 13 shows an example (1) of a virtual feature point (projected feature point)

FIG. 13 shows an example of a virtual feature point (projected feature point).

The identifier of the virtual feature point should match the identifier of the projected-from feature point. That is, the projected-from feature point information is used as the feature point information of the virtual feature point.

The target feature point shown in FIG. 13 has the following relation information. In addition, it has the virtual feature point information at another position of the fingerprint data.

The 0-th ridge is connected to the virtual feature point ID 9.

The first ridge is connected to the virtual feature point ID 12.

The second ridge is connected to the virtual feature point ID 8.

The minus first ridge is connected to the virtual feature point ID 13.

The minus second ridge is connected to the virtual feature point ID 12.

FIG. 15 shows an example of the type of data structure.

As shown in FIG. 15, the position, type, and direction are registered for the target feature point ID 11. Furthermore, the number of existing virtual feature points in the m-th (m is an integer) ridge is registered.

The target feature point matching process is performed as in the first embodiment. Only a different point is that a feature point matching process is performed on a virtual feature point in the present embodiment while the process is performed on the existing vicinal feature point according to the first embodiment.

The virtual feature point matching process is performed on a projected-from feature point. For example, in FIG. 13, when the virtual feature point ID 12 is checked, it is matched with the actual feature point ID 12. If a matching result is output, then it is determined that the virtual feature point ID 12 is a matching point.

Other matching procedures are the same as those according to the first embodiment.

Figure 14:
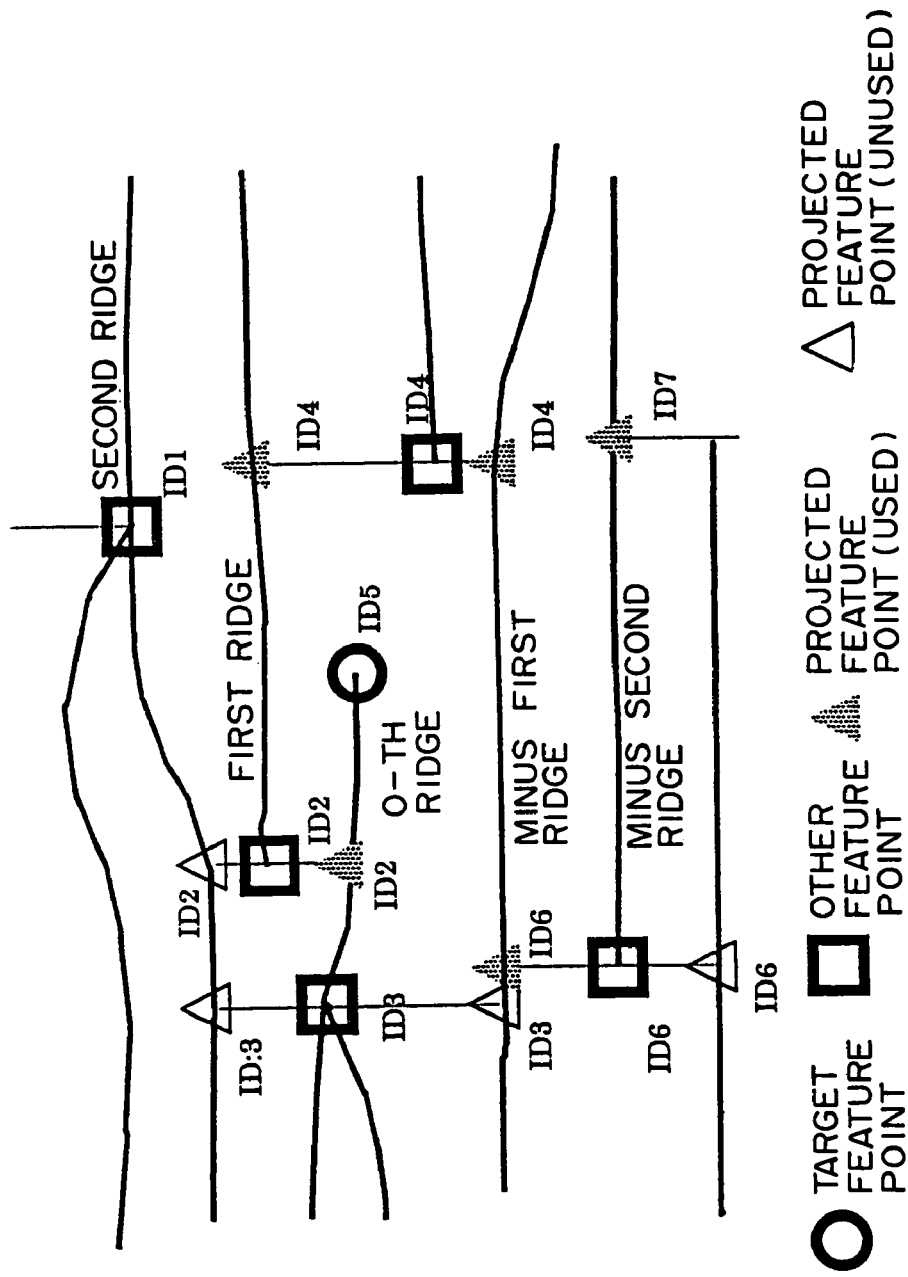
FIG. 14 shows an example (2) of a virtual feature point (projected feature point)

That is, when FIG. 13 shows a registered fingerprint, and FIG. 14 shows an input fingerprint, a target feature point to be checked is determined first. It is the feature point ID 11 in FIG. 13, and the feature point ID 5 in FIG. 14. Then, it is checked in FIGS. 13 and 14 which virtual feature point is contained in the n-th ridge near the target feature point. For example, in FIGS. 13 and 14, the target feature points ID 11 and ID 5 have, as relation information, the virtual feature points existing in the ridges at the closest points respectively from the target feature points ID 11 and ID 5. In FIGS. 13 and 14, the length of a ridge from the crossing point between the straight line vertical to the ridge from the target feature point and the ridge to the virtual feature point is checked, and the virtual feature point having the shortest ridge line is adopted.

Then, the position, type, and direction of the ID 9 (FIG. 13) and the ID 2 (FIG. 14) in the 0-th ridges are checked, and the 0-th ridge is checked for matching. The process is sequentially performed on the first ridge, second ridge, Thus, by performing the matching process using a virtual feature point, a correct matching result can be obtained because the process is performed based on the relation to the vicinal ridges even if the collection environments are different between a registered fingerprint and a fingerprint to be checked, and the ridges are distorted and changed slightly. According to the above mentioned embodiment, only one virtual feature point is selected for each ridge. However, the number of selected virtual feature points is not limited, but two, three, or a different number of virtual feature points can be selected for each ridge and checked for matching.

The fingerprint matching method according to the third embodiment can be used with the process procedure according to the first embodiment as is except a matching process to be performed on the ridge structure by setting and using a virtual feature point. Therefore, detailed descriptions are omitted here. According to the third embodiment, a matching process can be performed with higher precision by using the first and second embodiments in combination. An example of the combinational use is described below by referring to the fourth embodiment.

Described below is the fourth embodiment of the feature point matching method according to the present invention.

In the fourth embodiment of the feature point matching method according to the present invention, the feature point matching process can be correctly performed even if the type of vicinal feature point has been changed.

When a fingerprint image is read by a fingerprint scanner, the type of feature point depends on the state of the finger skin or the pressure of the finger. For example, a feature point is measured and output as an ending point when the finger softly touches the fingerprint scanner, but it can be measured and output as a bifurcation point when the finger strongly presses the fingerprint scanner.

According to the fourth embodiment, the matching process is performed by assuming that the type of feature point has been changed. Therefore, under such a type changing condition, the feature point matching process can be correctly performed.

The fourth embodiment is realized by combinational use with the first and third embodiments.

Hereinafter, a feature point and a virtual feature point connected to the n-th ridge is respectively referred to as an n-th primary related feature point and an n-th secondary related feature point.

FIG. 16 shows the fourth embodiment when the type of feature point has been changed.

The type of feature point may be changed when a ridge having an ending point as shown in FIG. 16A touches an adjacent ridge. On the other hand, when two touching ridged are disconnected, a bifurcation point is changed into an ending point.

An ending point is changed into a bifurcation point when the ridge having the ending point touches an adjacent ridge. Therefore, a bifurcation point appears close to the point where the original ending point existed. If the directions of the ending point and the bifurcation point are defined as described by referring to FIG. 1, the directions of the ridges of the feature points before and after the change are not different.

When the type of feature point is changed, for example, the 0-th primary related feature point as shown in FIG. 16B is changed into the 0-th secondary related feature point as shown in FIG. 16A. In addition, when the primary related feature point shown in FIG. 16A is changed into an ending point, the first secondary related feature point appears as shown in FIG. 16B. That is, when a feature point is changed, a primary related feature point is changed into a secondary related feature point while a secondary related feature point is changed into a primary related feature point in the ridge of the same order. In the feature point information, only the type (ending point or bifurcation point) is changed when the feature point is changed, but the coordinates and the direction hardly change.

That is, if a primary related feature point is matched with a secondary related feature point, the coordinates and the directions match within a predetermined range, and the types are different, then it indicates that the feature points have been changed, and the feature points are the same they initially were. Thus, the feature point matching process can be correctly performed even if a feature point is changed.

Figure 17:
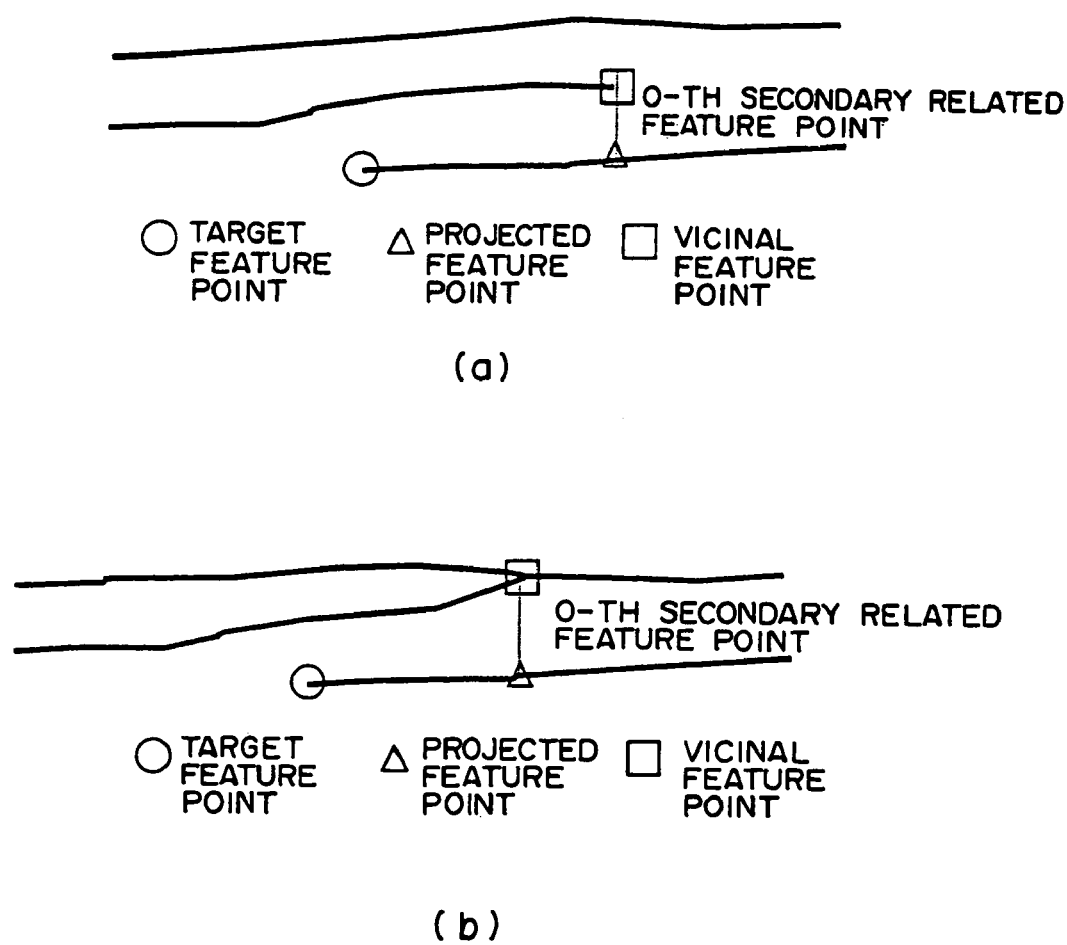
FIG. 17 shows another example of a change in type of feature point.

FIG. 17 shows another example of a change in type of feature point.

Assume that, as shown in FIG. 17A, the projected-from feature point of the 0-th secondary related feature point is an ending point, and touches the adjacent ridge as shown in FIG. 17B. In this case, the matching process outputs different types because the feature points match in position and direction. If the feature points completely match each other in position, direction, and type, then it is assumed that they are the same feature points, However, when they are different only in type, it is predicted that the feature point has been changed.

If it is determined that a feature point has been changed as shown in FIGS. 16 and 17, it is assumed that the feature point is unstable, and a small point is marked in the feature point matching process.

An example of the feature point matching method is described below by referring to FIGS. 13 and 14. FIG. 13 shows a preliminarily registered fingerprint (registered fingerprint), and FIG. 14 shows a fingerprint (input fingerprint) to be checked.

As shown in the example of the data structure in FIG. 18, the data for the target feature point ID 11 stores the following information in the case shown in FIG. 13 in addition to the position, type, and direction of the ID 11 itself.

The primary and secondary related feature points of the 0-th ridge are respectively the ID 10 and the ID 9.

The primary and secondary related feature points of the first ridge are respectively the ID 9 and the ID 12.

The primary and secondary related feature points of the second ridge are respectively the ID 9 and the ID 8.

The primary and secondary related feature points of the minus first ridge are respectively the ID 12 and the ID 13.

The primary and secondary related feature points of the minus second ridge are respectively the ID 13 and the ID 12.

Similarly, the target feature point ID5 shown in FIG. 14 contains the following relation information.

The primary and secondary related feature points of the 0-th ridge are respectively the ID 3 and the ID 2.

The primary and secondary related feature points of the first ridge are respectively the ID 2 and the ID 4.

The primary and secondary related feature points of the second ridge are respectively the ID 1 and the ID 2.

There are no primary related feature point of the minus first ridge, and the secondary related feature point of the minus first ridge is the ID 4.

The primary and secondary related feature points of the minus second ridge are respectively the ID 6 and the ID 7.

First, the vicinal feature point matching processes are performed on the 0-th ridges.

As in the method according to the first and third embodiments, the matching processes are performed between primary related feature points and between secondary related feature points. In this example, the 0-th vicinal feature point ID 10 shown in FIG. 13 is matched with the 0-th vicinal feature point ID 3 shown in FIG. 14, and the 0-th vicinal feature point ID 9 shown in FIG. 13 is matched with the 0-th vicinal feature point ID 2 shown in FIG. 14. Since the primary related feature points match each other, and the secondary related feature points match each other in the 0-th ridges in this case, the matching processes on the 0-th ridges are completed. Assuming that one point each is marked for each matching result, the matching mark of the 0-th ridges is 2.

Next, the matching processes are performed on the first ridges.

The matching processes are performed between primary related feature points and between secondary related feature points. In this example, the primary related feature point ID 9 shown in FIG. 13 is matched with the primary related feature point ID 2 shown in FIG. 14, and the secondary related feature point ID 12 shown in FIG. 13 is matched with the secondary related feature point ID 2 shown in FIG. 14. In the matching process between the primary related feature point ID 9 shown in FIG. 13 and the primary related feature point ID 2 shown in FIG. 14, the feature points match in position and direction, but are different in type. Therefore, the matching results indicate that the feature point has been changed. As a result, the matching mark of the first primary related feature point is set to 0.5. Similarly, in the matching process between the secondary related feature point ID 12 shown in FIG. 13 and the secondary related feature point ID 4 shown in FIG. 14, the feature points match in position and direction, but are different in type. Therefore, the matching mark of the first secondary related feature point is also set to 0.5. Thus, the matching mark of the first ridge is a total of 1.

Then, the matching processes are performed on the second ridges.

In FIG. 13, the primary and secondary related feature points of the second ridge are respectively the ID 9 and the ID 8. In FIG. 14, the primary and secondary related feature points of the second ridge are respectively the ID 1 and the ID 2. Therefore, the matching process between the primary related feature points outputs a non-matching result. Similarly, the matching process between the secondary related feature points also output a non-matching result, Then, assume that the feature point has been changed. That is, a matching process is performed between the primary related feature point and the secondary related feature point.

The primary related feature point ID 9 of the second ridge shown in FIG. 13 is matched with the secondary related feature point ID 2 of the second ridge shown in FIG. 14. In the matching process, the feature points match in position and direction, but are different in type. Since they are different in type, it is determined that the feature point has been changed. As a result, the matching mark of the primary related feature point of the second ridge shown in FIG. 13 is set to 0.5.

Similarly, the secondary related feature point ID 8 of the second ridge shown in FIG. 13 is matched with the primary related feature point ID 1 of the second ridge shown in FIG. 14. Also in this case, the feature points match in position and direction, but are different in type only. Therefore, it is determined that the feature point has been changed. As a result, the matching mark of the secondary related feature point of the second ridge shown in FIG. 13 is set to 0.5. Thus, the matching mark of the second ridge is a total of 1.

Thus, the similar matching processes are performed on the ridges of other orders. Finally, the matching mark of the target feature point is set as the total matching mark of each ridge. If the total matching mark exceeds a predetermined value, it is determined that the target feature point is matching.

Described below is the fifth embodiment of the feature point matching method according to the present invention. The fifth embodiment is an extension of the first through the fourth embodiments. That is, the matching performance is improved by adding the method described below to the first through the fourth embodiments.

According to the fifth embodiment, a feature point matching process can be correctly performed even when a target feature point is changed.

By adjusting the orders of ridges, target feature points can be matched with each other even when they are different in type between the registered fingerprint and the input fingerprint.

FIG. 19 shows the case in which the type of target feature point has been changed.

As shown in FIG. 19, when a target feature point is changed from an ending point to a bifurcation point, or from a bifurcation point to an ending point, the order of the ridge containing the primary related feature point is shifted by 1.

For example, as shown in FIG. 19, when the target feature point which has been an ending point touches the first ridge, the first ridge turns to the 0-th ridge. Similarly, the positive order becomes smaller by 1. On the other hand, when the target feature point which has been an ending point touches the minus first ridge, the minus first ridge turns to the 0-th ridge. Thus, the negative order becomes larger by 1.

The concept can be applied to the case in which a bifurcation point is changed into an ending point. Similarly, it can be applied to the case in which the number of ridges is counted.

Therefore, when a matching process is performed on target feature points which are different in type, for example, the following steps are followed.

Step 1

Assume that a target feature point which is an ending point touches the first ridge, and becomes a bifurcation point, and that a target feature point matching process is performed. That is, the positive order of the ridge of a target feature point on the ending point side is reduced by 1, and the matching mark is obtained in the method used when the target feature points of the same type are processed.

Step 2

Assume that a feature point which is an ending point has been changed into a bifurcation point after it has touched the minus first ridge, and that a target feature point matching process is performed. That is, the negative order of the ridge is reduced by 1, and the matching mark is obtained in the method used when the target feature points of the same type are processed.

Step 3

A matching mark whichever is larger between the above mentioned two matching marks is defined as the final matching mark of the target feature point. In the method above, if the matching mark of the target feature point, then there is a strong possibility that the target feature points have been changed in the process of taking fingerprint images, and the target feature points can be determined to be the same feature points although they are different in type. The prediction may not be correct. In this case, a threshold can be strictly set for determination of the same feature points.

As described above, the process shown by the flowchart in FIG. 8 is performed by combining the fourth embodiment with the first embodiment.

FIGS. 20 through 24 are flowcharts of the processes according to the embodiments shown in FIGS. 4 and 5.

Figure 20:
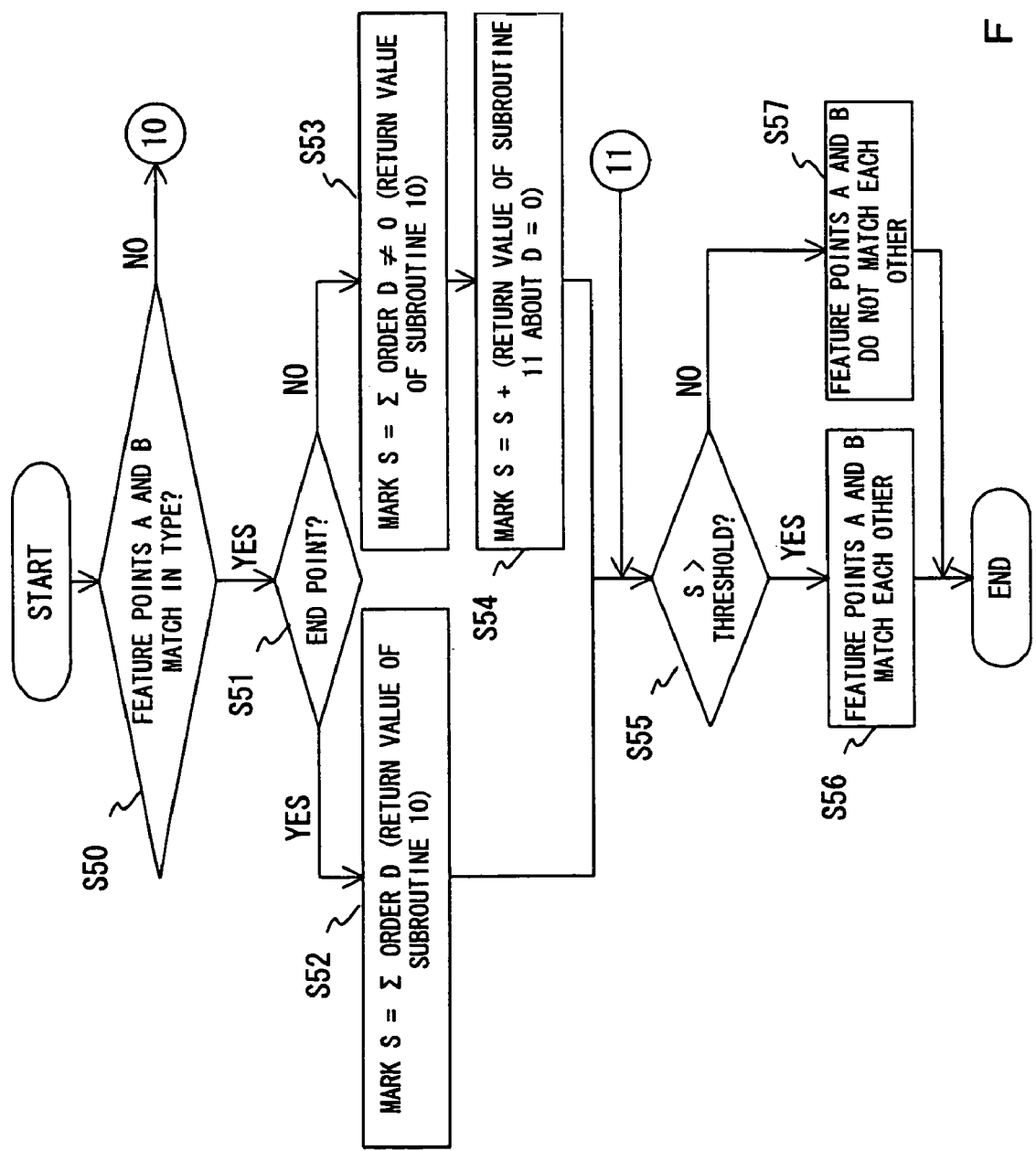
FIG. 20 is a flowchart (1) of the process according to the fourth and fifth embodiments of the present invention.

FIG. 20 is a flowchart of the main process.

First, in step S50, it is determined whether or not the target feature point A matches the target feature point B in type.

Figure 23:
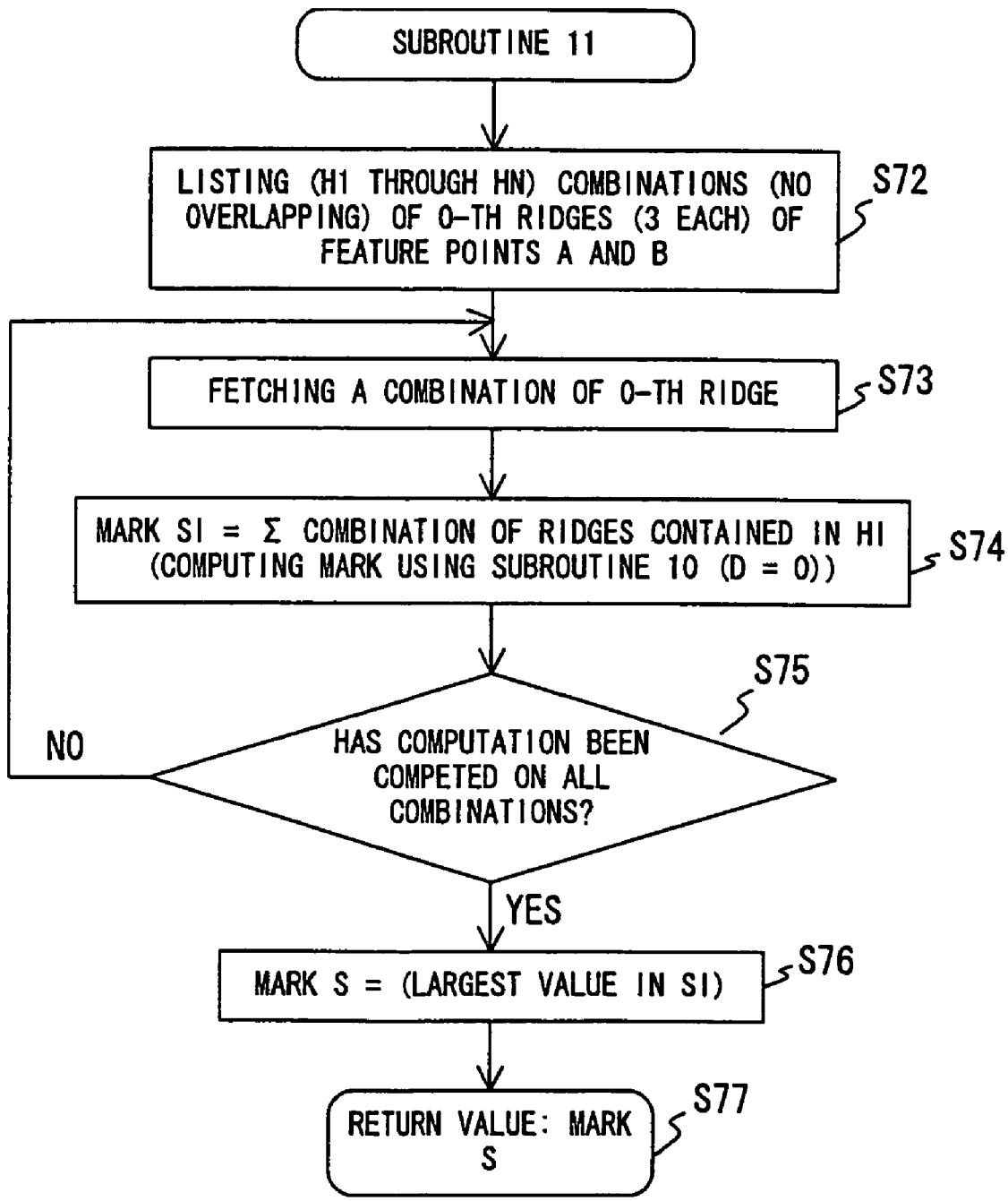
FIG. 23 is a flowchart (4) of the process according to the fourth and fifth embodiments of the present invention.

When they are different from each other in type, control is passed to the process shown in FIG. 23. When they match in type, then control is passed to step S51, and it is determined whether or not the type of the feature points A and B refers to an ending point. If the type refers to an ending point, then control is passed to step S52, the image storage unit 10 is invoked, and the return value of the subroutine is added as a matching mark. When the addition is performed on the ridges of all orders, control is passed to step S55.

If it is determined in step S51 that the type of the feature points A and B is not an ending point, then the marks are added up by the subroutine 10 for the ridges other than the 0-th ridges in step S53, the marks are added up for the 0-th ridges by the subroutine 11, and control is passed to step S55.

It is determined in step S55 whether or not the total mark is larger than a threshold. If it is larger than the threshold, then it is determined in step S56 that the feature points A and B match each other. If it is determined in step S55 that the total mark is equal to or smaller than the threshold, then it is determined that the feature points A and B do not match each other (step S57) thereby terminating the process.

Figure 21:
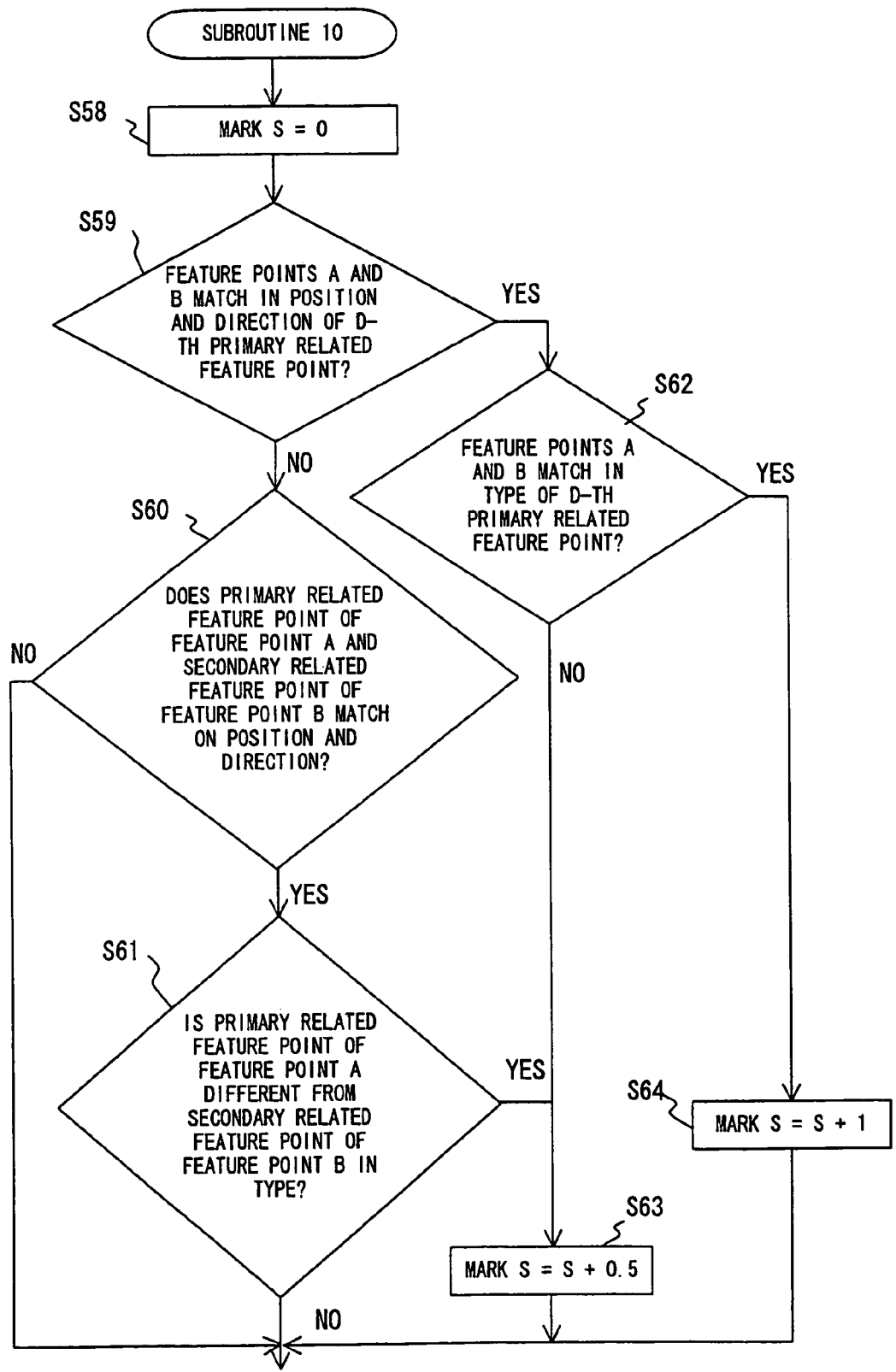
FIG. 21 is a flowchart (2) of the process according to the fourth and fifth embodiments of the present invention.
Figure 22:
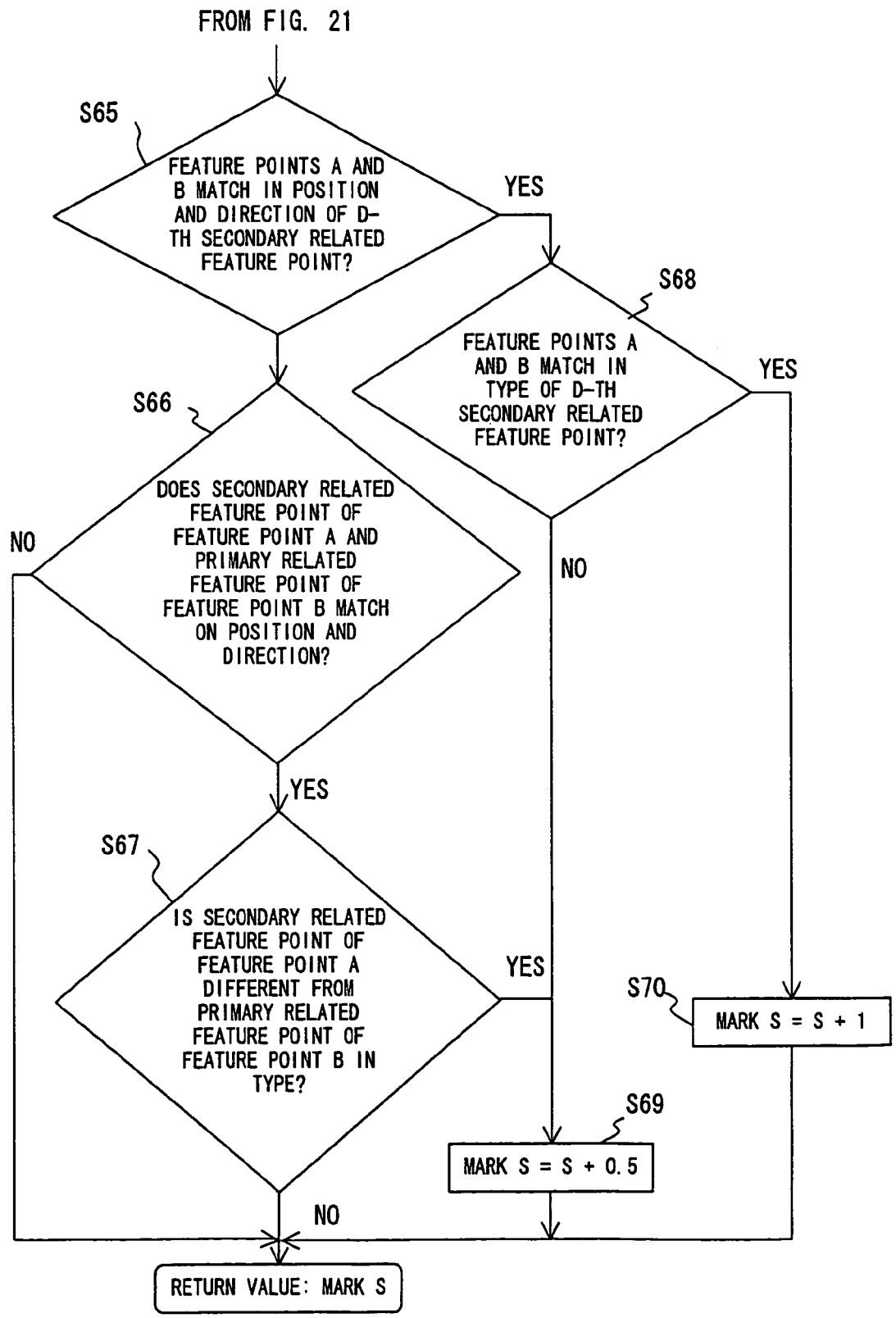
FIG. 22 is a flowchart (3) of the process according to the fourth and fifth embodiments of the present invention.

FIGS. 21 and 22 are flowcharts of the process of the subroutine 10.

In step S58, the variable for setting a mark is initialized to 0. Then, it is determined in step S59 whether or not the feature points A and B match in position and direction of the D-th primary related feature point. If they match each other, it is determined in step S62. If YES in step S62, then one point is added to the mark S, and control is passed to step S65. If it is determined in step S62 that they don't match in type, then 0.5 point is added to the mark, and control is passed to step S65.

If it is determined in step S59 that the feature points A and B do not match in position and direction of the D-th primary related feature point, then control is passed to step S60, and it is determined whether or not the feature points A and B match in position and direction of the secondary related feature point. If they do not match, then control is passed to step S65. If it is determined in step S60 that they match in position and direction, then it is determined in step S61 whether or not the feature points A and B match in type of the secondary related feature point. If YES, then control is passed to step S65 shown in FIG. 22. If NO, then control is passed to step S63, 0.5 point is added to the mark, and control is passed to step S65 shown in FIG. 22.

In step S65, it is determined whether or not the feature points A and B match in position and direction of the D-th secondary related feature point. If YES, then it is determined in step S68 whether or not the feature points A and B match in type of the D-th secondary related feature point. If YES, then one point is added to the mark, and control is passed to step S71. If NO in step S68, then 0.5 point is added to the mark in step S69, and control is passed to step S71.

If it is determined in step S65 that the feature points A and B do not match in position and direction of the D-th secondary related feature point, then control is passed to step S66, and it is determined whether or not the feature points A and B match in position and direction of the primary related feature point. If they do not match, then control is passed to step S71. If they match, then it is determined in step S67 whether or not the secondary related feature point of the feature point A matches the primary related feature point of the feature point B match in type. If it is determined in step S67 that they do not match in type, then 0.5 point is added to the mark in step S69, and control is passed to step S71. If it is determined that they match in type in step S67, then control is passed to step S71. In step S71, the mark S obtained in the processes above is used as a return value, and control is returned to the main process.

FIG. 23 is a flowchart of the process of the subroutine 11.

When the subroutine 11 is invoked, combinations (no overlapping) of the 0-th ridges (3: in this case, the feature point is a bifurcation point) of the feature point A and the feature point B are listed (H1 through Hn). In step S73, a combination Hi of the 0-th ridges is fetched. In step S74, a mark is computed by the subroutine 10 for the combination of ridges contained in the combination Hi of the 0-th ridges with the D set to 0. The sum of the marks is substituted for the variable Si. Then, it is determined in step S75 whether or not the computation has been completed for all combinations. If not, control is returned to step S73, and the computation is performed on other combinations. If it is determined in step S75 that the computation is completed for all combinations, then control is passed to step S76, the largest value in the marks Si obtained from the plurality of combinations is set as the mark S, and the return value is set as the mark S in step S77, thereby returning to the main process.

Figure 24:
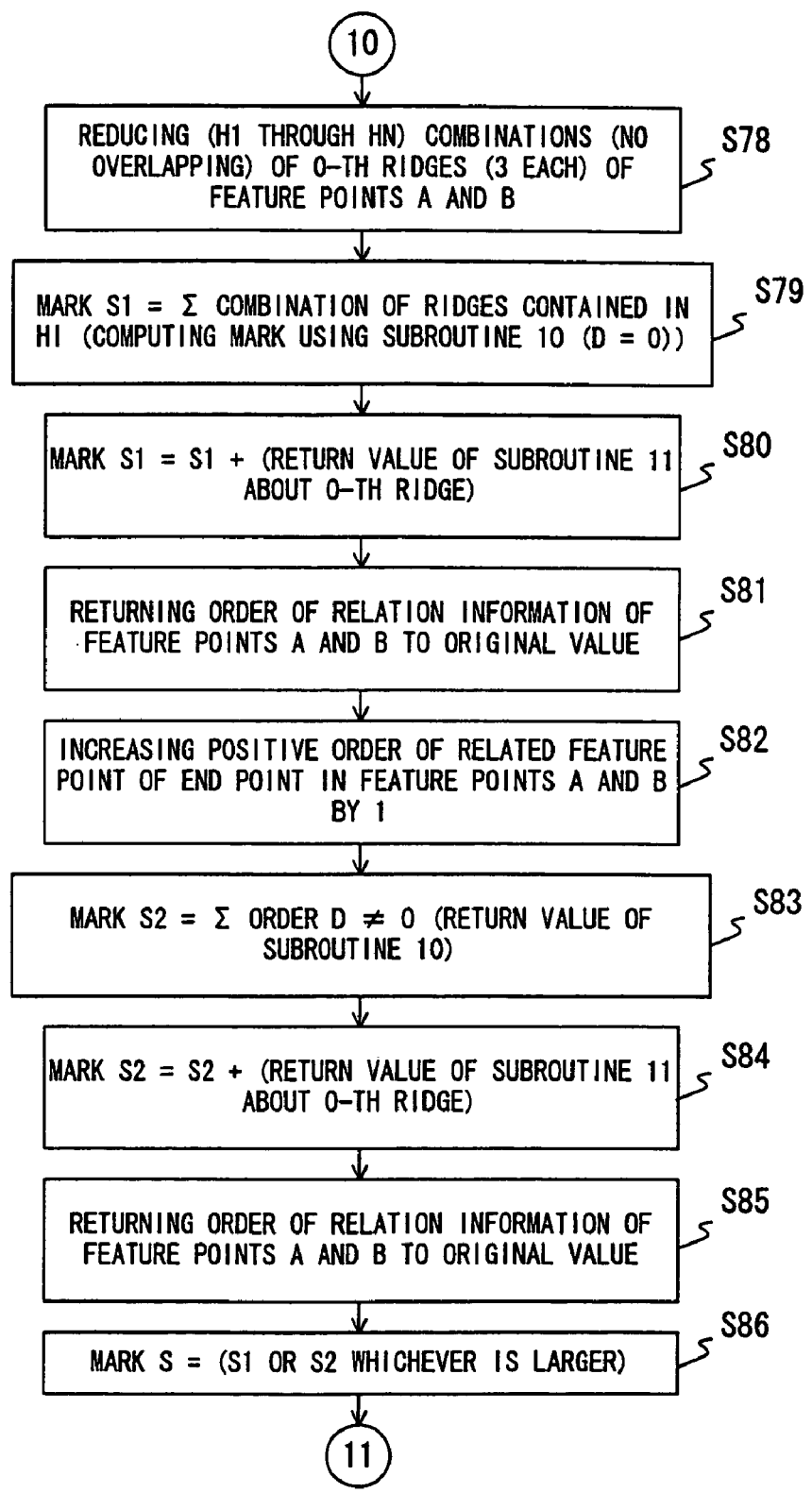
FIG. 24 is a flowchart (5) of the process according to the fourth and fifth embodiments of the present invention.

FIG. 24 is a flowchart of the process performed when it is determined in step S50 that the feature points A and B do not match in type.

In step S78, the positive orders of the related feature points as ending points are reduced by 1 in the feature points A and B. Then, in step S79, the mark S1 is obtained by the subroutine 10 for the ridges other than the 0-th ridges. Then, in step S80, the mark is obtained by the subroutine 11 for the 0-th ridges, and the result is added to the S1 to obtain a total mark of S1.

Then, in step S81, the orders of the relation information about the feature points A and B are returned to the original values. In step S82, the negative orders of the related feature points as ending points in the feature points A and B are incremented by 1.

Then, in step S83, the mark S2 is computed by the subroutine 10 for the ridges other than the 0-th ridges. Then, in step S84, the mark is computed by the subroutine 11 for the 0-th ridges, and the result is added to the previously obtained mark S2. In step S85, the orders of the relation information about the feature points A and B are returned to the original values. In step S86, the mark S1 or S2 whichever is larger is set as a total mark S, and control is passed to step S55.

Figure 25:
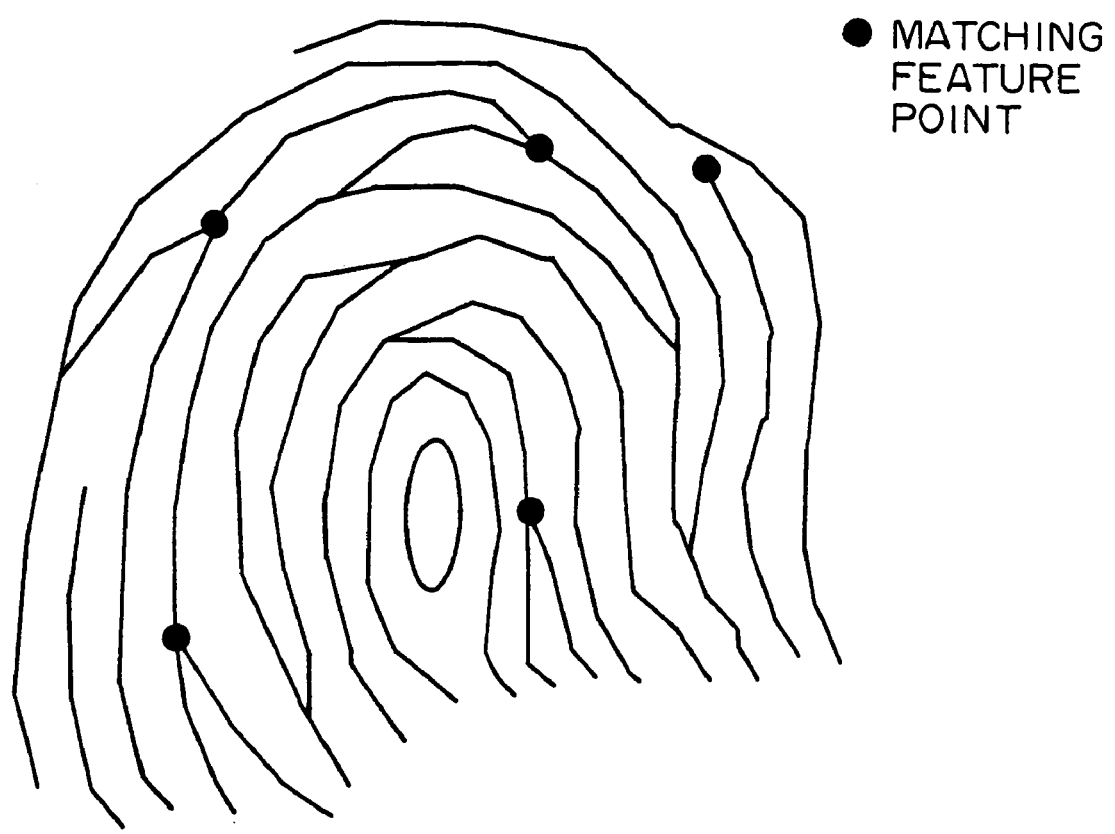
FIG. 25 shows a chain matching process (1)
Figure 26:
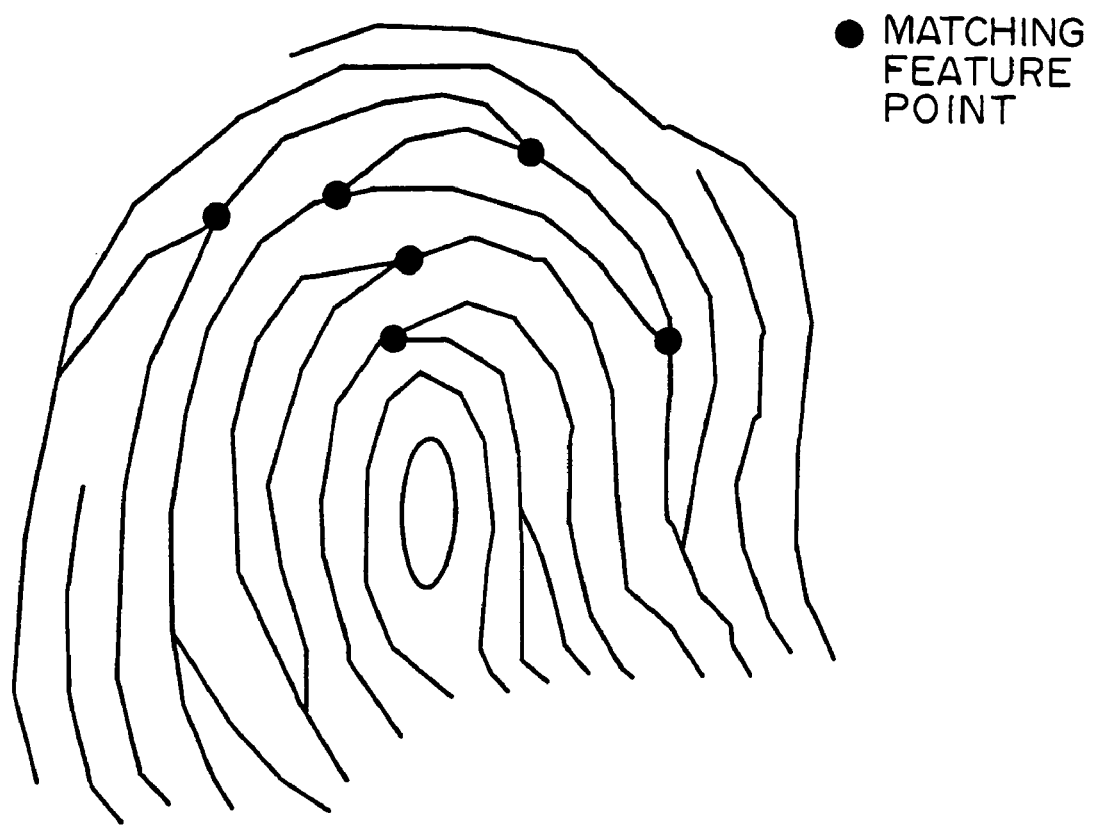
FIG. 26 shows a chain matching process (2)

FIGS. 25 and 26 show chain matching processes.

In the above mentioned embodiment, the positions of two feature points fundamentally close to each other are compared with each other, and a feature point matching process is performed. Therefore, the feature point matching process is performed by comparing only local portions of the registered fingerprint and the input fingerprint. As a result, similar ridge structures in a local portion can be mistakenly recognized in the fingerprint matching process. To prevent this, the relation information matching process should be performed not on a local portion, but on a global area. To realize this, the feature points connected through relation information should match each other. When the matching feature points occur in a chain form, the matching mark is set to a large value. When the matching feature points occur in a chain form, a large value of a matching mark can be obtained by highly evaluating the matching result of ridge structures in a global area.

Described below in detail is the above mentioned process.

Some matching feature points can be detected even when two different fingerprints are checked. Therefore, it is necessary to set a threshold in determining whether or not two fingerprint match each other, and the trade-off between erroneous rejection and erroneous authentication. Erroneous authentication refers to satisfying a matching determination condition for different fingerprints which share some matching feature points.

When a feature point matching result is observed in the case where the erroneous authentication occurs, matching feature points are located apart in many cases. For example, assume that two feature points match each other when two n-th ridges are matched with each other in the embodiment according to the present invention. If the fingerprints result in the erroneous authentication, the matching portions of the target feature points are locally located, thereby satisfying a matching condition (FIG. 25 schematically shows this).

It is natural that the vicinal feature points around the matching feature points also match each other in the same fingerprints because it can be assumed that a feature point matching a feature point to be checked indicates a correct fingerprint image in the local area, thereby implying correct extraction of a vicinal feature point (FIG. 26 schematically shows this).

Therefore, to suppress the above mentioned erroneous authentication, it is checked whether or not a group of matching feature points appear. It is determined that a group of matching feature points appear by checking whether or not the matching feature points are connected through ridges.

Figure 27:
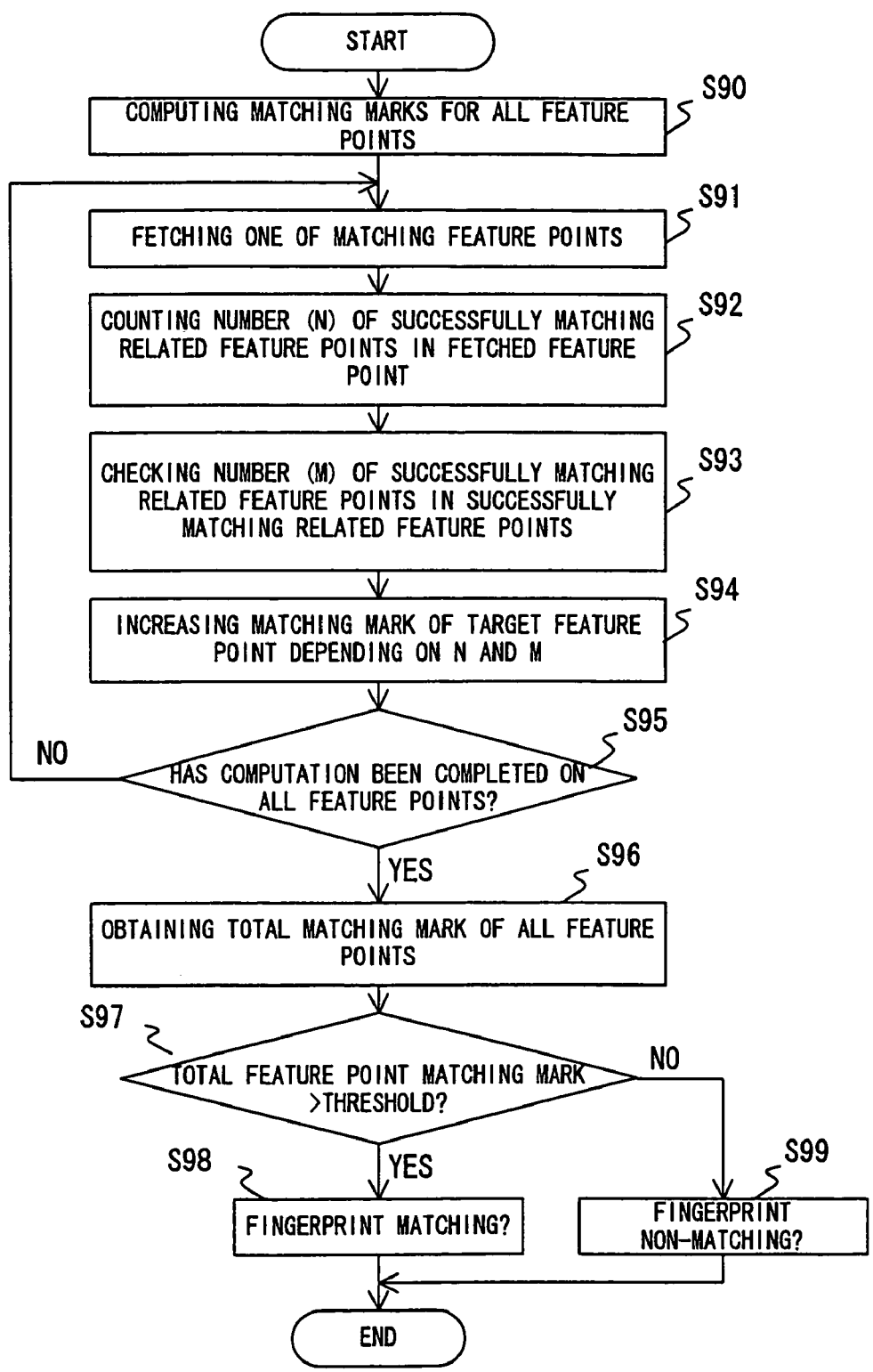
FIG. 27 is a flowchart of the process for checking whether or not fingerprints match each other as a pattern.

FIG. 27 is a flowchart of the process of checking whether or not fingerprints match in a chain form as described above in the sixth embodiment of the present invention.

The flowchart in FIG. 27 shows an example of computing two rings of chain. In the fingerprint matching determination shown in FIG. 27, the number of matching fingerprints is not counted, but it is determined whether or not the total mark of matching feature points exceeds a matching determination threshold. The method of determining a matching result is not limited to the method shown in FIG. 27.

In step S90, the matching marks of all feature points are computed. Then, in step S91, one feature point is selected from among matching feature points to concentrate the matching process on one target feature point. In step S92, the number (n:n is a positive number) of matching feature points in the related feature points of the selected feature point is counted. Then, in step S93, in the matching related feature points, the number (m:m is a positive number) of matching feature points of the related feature points is counted. In step S94, the matching mark of a target feature point is increased depending on the value of n and m. For example, it is multiplied by (1+0.1n+0.2m). It is determined n step S95 whether or not the computation has been completed for all feature points. If not, control is returned to step S91, and the computation is performed on the feature points for which the computation has not yet been performed. If it is determined n step S95 that the computation has been completed for all feature points, then the matching marks are obtained for all feature points in step S96, and it is determined in step S97 whether or not the total matching mark of feature points is larger than a predetermined threshold. If the total mark is equal to or smaller than the threshold, then it is determined in step S99 that the fingerprints do not match each other.

Figure 28:
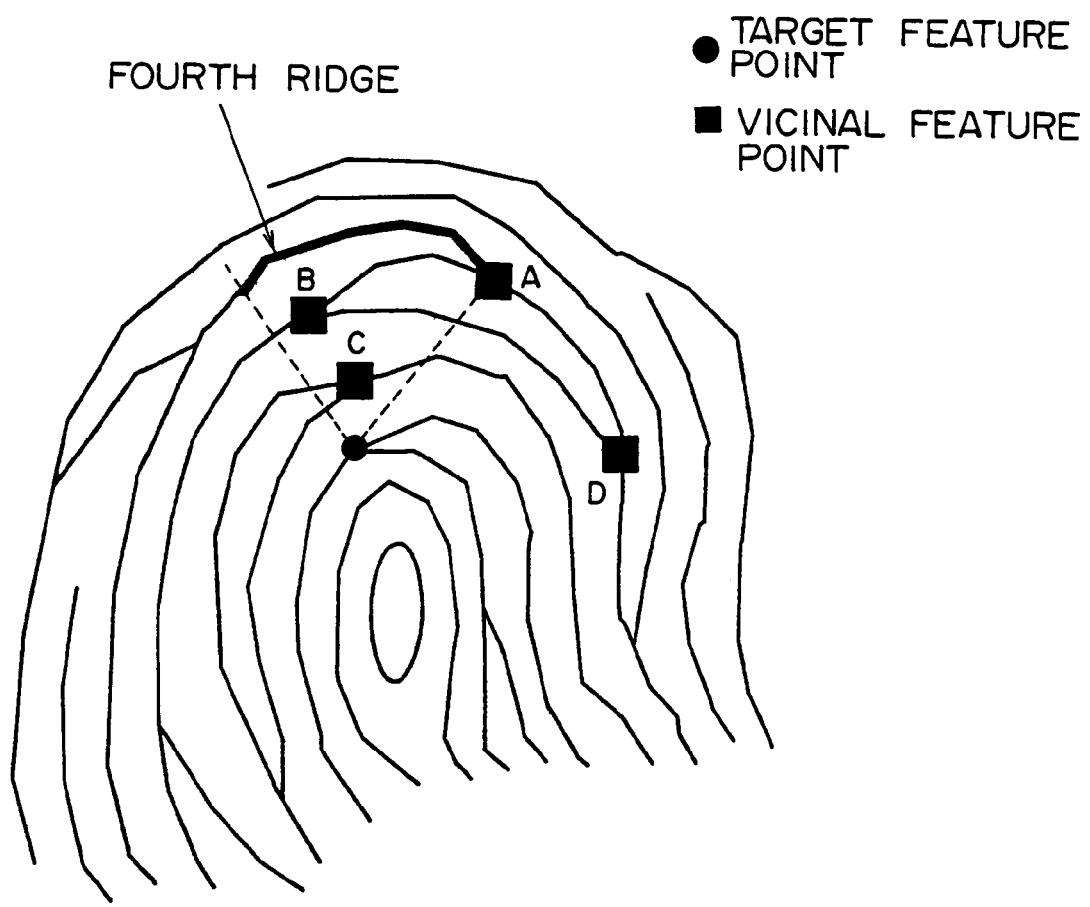
FIG. 28 shows the seventh embodiment of the present invention.

FIG. 28 shows the seventh embodiment of the present invention.

The relation information of a target feature point is listed below based on the example shown in FIG. 28.

1) The vicinal feature point A is connected to the fourth ridge.

There are two ridges between the vicinal feature point A (also referred to as a connected feature point because it is connected to the fourth ridge) and the target feature point (the number of ridges between the vicinal feature point and the target feature point is detected from the fingerprint images in the above mentioned embodiment).

The type of a connected feature point is a bifurcation point.

2)

The vicinal feature point B . . .

thus, similar information described in 1) above is obtained about each vicinal feature point.

When vicinal feature points are matched with each other, their relation information is matched with each other. That is, if the order of the ridge is equal to the number of ridges to a connected feature point and the forms of the connected feature points match each other when vicinal feature points are matched with each other, then it is determined that the ridge structures to the vicinal feature points match. It is determined that target feature points match each other when the number of vicinal feature points exceeds a predetermined value.

According to the seventh embodiment, the number of feature points in an area enclosed by the dotted line shown in FIG. 28 and the fourth ridge is confirmed. Thus, the order of ridges, the number of ridges, and the form of a feature point are fixed even when the deformation or the rotation of a fingerprint changes, thereby stabilizing the matching process. That is, the matching process can be correctly performed against the deformation of a fingerprint depending on the pressure of the finger when it is pressed onto a scanner.

According to the present embodiment, the number of ridges between a connected feature point and a target feature point can be counted in various methods. For example, they can be the counting method of the above mentioned embodiment, the method of including the ridge containing a connected feature point, the method of counting both ridges containing a connected feature point and a target feature point, the method of counting the ridge containing a target feature point, but not counting the ridge containing a connected feature point, etc. The matching performance can be improved when the vicinal feature point matching method according to the seventh embodiment is combined with the methods according to the first through the fifth embodiments.

Figure 29:
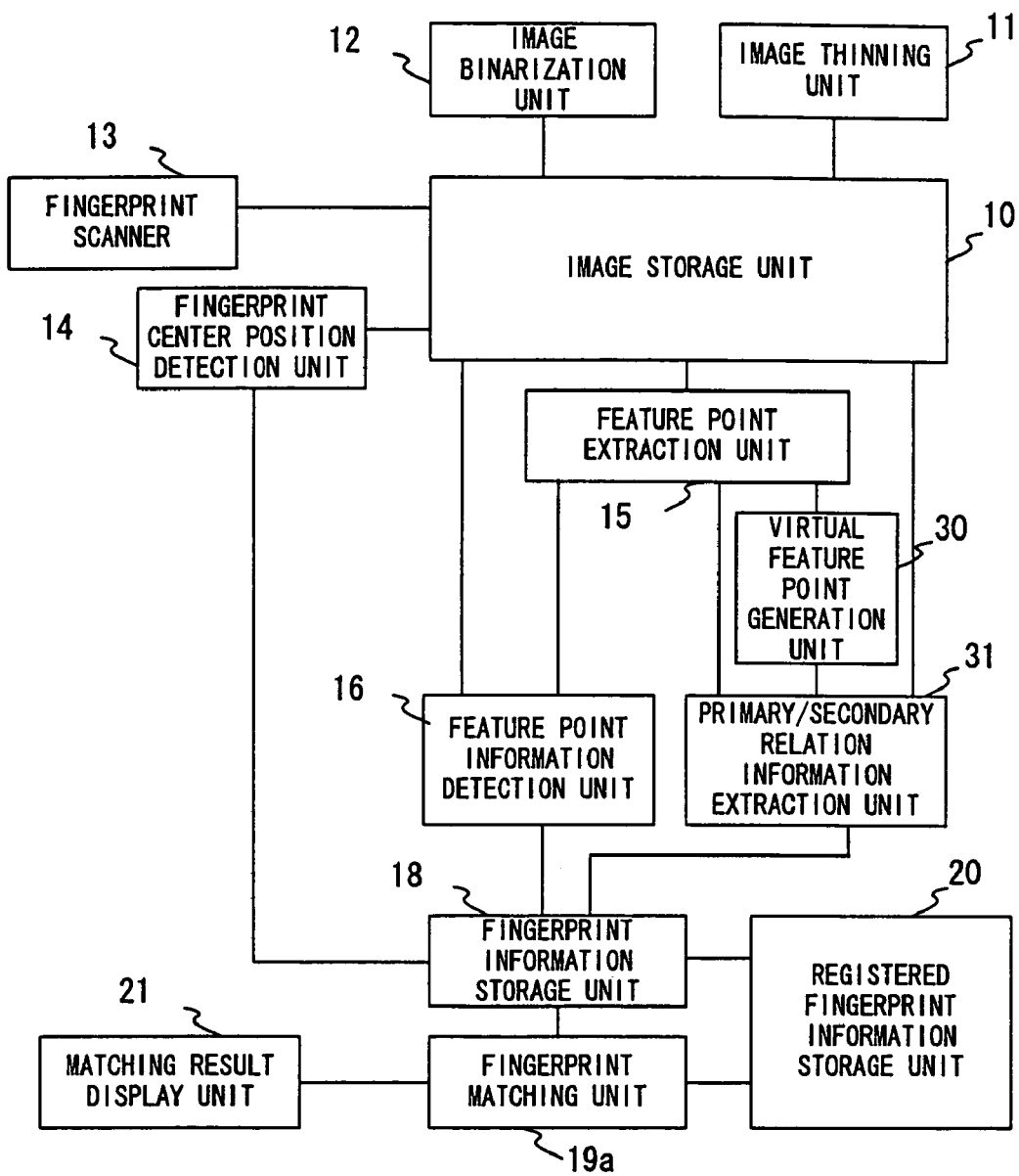
FIG. 29 is a block diagram of the functions of the apparatus for realizing the third through the seventh embodiments of the present invention.

FIG. 29 is a block diagram of the functions of the device for realizing the third through the seventh embodiments of the present invention.

In FIG. 29, the components also shown in FIG. 11 are assigned the same numbers as those assigned in FIG. 11, and the detailed explanation is omitted here.

With the configuration shown in FIG. 29, a virtual feature point generation unit 30 is provided in addition to the configuration shown in FIG. 11, and the primary relation information extraction unit is replaced with a primary/secondary relation information extraction unit 31. The fingerprint matching unit 19a realizes a matching method described above in the third through the sixth embodiments. The virtual feature point generation unit 30 generates a virtual feature point from the input thinned fingerprint image and the information about a feature point extracted by the feature point extraction unit 15. In addition, the primary/secondary relation information extraction unit 31 determines the primary/secondary relation between feature points according to the thinned fingerprint image and the information about the virtual feature point.

FIG. 30 is a flowchart of the operation procedure of the apparatus shown in FIG. 29.

First, the fingerprint scanner 13 collects a multivalue fingerprint image (step S110). The collected multivalue fingerprint image is stored in the image storage unit 10. The image binarization unit 12 binarizes the multivalue fingerprint image (step S111), and stores the result in the image storage unit 10 again. The image thinning unit 11 performs a thinning process to obtain the core of a fingerprint ridge from the binarized fingerprint image. The thinned fingerprint image is stored in the image storage unit 10. The fingerprint center position detection unit 14 detects the center of a fingerprint from a multivalue image, a binarized image, etc. (step S112). The method of detecting the center of a fingerprint can be selected from various conventional methods as described above.

The feature point extraction unit 15 extracts the position of a feature point of a fingerprint from a thinned fingerprint image (step S113). The feature point information extraction unit 16 detects the feature point information about the position, type, and direction of the feature point from the position of the feature point and the thinned image (step S114). The virtual feature point generation unit 30 generates the vicinal feature point from the feature point information and the thinned fingerprint image (step S115). The primary/secondary relation information extraction unit 31 extracts the primary/secondary relation between the feature point and the virtual feature point from the feature point information and the thinned image, and stores the primary/secondary relation information in the feature point information (step S116).

The fingerprint information storage unit 18 stores fingerprint information including the collected position of the center of the fingerprint, the feature point information, and the primary/secondary relation information (step S117) The registered fingerprint information storage unit 20 is a database in which preliminarily measured fingerprint information has been stored.

The fingerprint matching unit 19a matches generated fingerprint information with the preliminarily registered specific fingerprint (step S118). The matching method can be any of the methods according to the third through the seventh embodiments described above.

Assuming that registered fingerprint information is referred to as a registered fingerprint, and a fingerprint to be checked whether or not it matches the registered fingerprint is referred to as an input fingerprint, the registered fingerprint and the fingerprint to be checked are aligned first as described above by referring to FIG. 12, The position of the fingerprint in the fingerprint image depends on each time when a fingerprint image is taken. Therefore, the positions of the feature points cannot be matched with each other unless the coordinate axis common between the registered fingerprint and the input fingerprint is set. As a common coordinate axis, for example, a coordinate axis having the center of the fingerprint as its origin. Otherwise, a common coordinate axis can be set by using a specific feature point as an origin.

Then the subsequent processes are performed by appropriately combining the matching methods described in the third through the seventh embodiments. Since the matching methods according to the third through the seventh embodiments have been described above, the explanation is omitted here.

The process terminates in step S119 after displaying the matching result.

Figure 31:
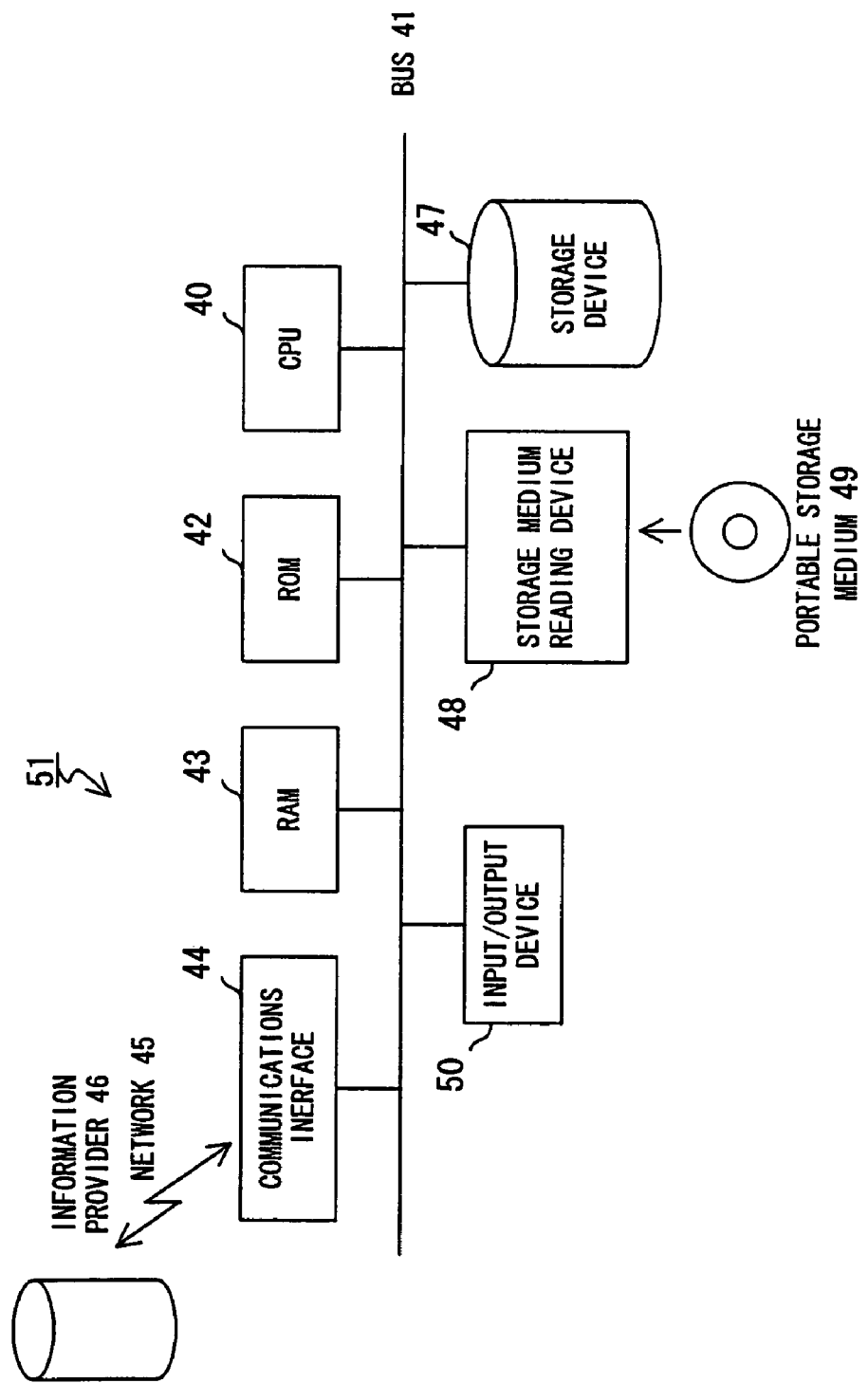
FIG. 31 shows an example of the configuration of the hardware required when the embodiments of the present invention are realized using a program.

FIG. 31 shows an example of the hardware configuration required when the present embodiment is realized by a program.

The process of the above mentioned embodiment can be realized by a program operating in a general purpose computer 51. In this case, the general purpose computer 51 can be realized by devices, connected to a CPU 40 through a bus 41, mutually exchanging data with one another. A BIOS, etc. is incorporated into ROM 42 to exchange data with an input/output device 50, etc. When the general purpose computer 51 is used as an exclusive fingerprint matching device, the CPU 40 can have a program in the ROM 42. The input/output device 50 normally comprises a keyboard, a mouse, a display, etc., but a scanner for capturing a fingerprint image is required when a fingerprint matching process is performed.

Normally, the program can be stored in a storage device 47 such as a hard disk, etc., developed in the RAM 43 at an instruction of the CPU 40 as necessary, and executed by the CPU 40. Otherwise, the program can be stored from the portable storage medium 49 (CD-ROM, Disket, DVD, etc,.) into the storage device 47, read from the storage device 47 to RAM 43, and executed by the CPU 40.

In the environment in which a computer network such as Internet, etc. has been highly developed, a program can be connected to a network 45 through a communications interface 44, and can be downloaded from an information provider 46 for execution. Otherwise, as in a LAN, etc., when the information provider 46 functions as a server of a LAN, the CPU 40 can execute a program in a network environment without downloading the program directly from the information provider 46. In addition, data about a fingerprint can be transmitted to and processed by the information provider 46, and the general purpose computer 51 can only receive the result.

A plurality of input/output devices 50 (especially a device for reading a fingerprint image) can be provided at several positions where a fingerprint matching process is to be performed, and the matching process is performed by the general purpose computer 51 mounted in the center.

A network of feature points connected through ridges remains unchanged in structure even when a fingerprint deforms, becomes expanded or contracted, or partly lacks. Therefore, according to the present invention, high matching performance can be obtained using the ridge structure of fingerprints and the positions of feature points.

What is claimed is:

1. An apparatus comparing an obtained first fingerprint with a preliminarily registered second fingerprint, and determining whether or not the fingerprints match each other, comprising:

a ridge relation obtaining unit obtaining relation of a ridge containing a vicinal feature point near a feature point to be checked in a matching process performed on the first and the second fingerprints to the ridge containing the feature point to be checked in the matching process; and a matching unit performing the matching process by searching the second fingerprint containing the vicinal feature point near the feature point to be checked in the matching process for the relation of the ridge containing the vicinal feature point to the ridge containing the feature point to be checked in the matching process, and, wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are the same feature points.

2. The apparatus according to claim 1, wherein information about the feature point has a format comprising an identifier assigned to each feature point and corresponding feature information about the feature point.

3. The apparatus according to claim 1, wherein when a number of ridges from the feature point to be checked to a ridge containing the vicinal feature point, and when feature information about the vicinal feature points matches in a predetermined range, it is determined that feature points to be checked contained in the first and the second fingerprints are same feature points.

4. The apparatus according to claim 1, wherein in said first and second fingerprint, when feature information about the vicinal feature points matches in a predetermined range, a number of ridges between the feature point to be checked and a ridge containing the vicinal feature point matches a value obtained by counting a number of ridges in an opposite direction from the feature point to be checked to the vicinal feature point, and a number of ridges between the feature point to be checked and a ridge containing the vicinal feature point matches a value obtained by counting a number of ridges in a direction from the feature point to be checked to the vicinal feature point, it is determined that feature points to be checked contained in the first and the second fingerprints are same feature points.

5. The apparatus according to claim 1, wherein when said feature points to be checked match in position and direction in a predetermined range, but are different in type in said first and second fingerprints, a resultant matching level is low.

6. The apparatus according to claim 1, wherein when said vicinal feature points match in position and direction in a predetermined range, but are different in type in said first and second fingerprints, a resultant matching level is low.

7. The apparatus according to claim 1, wherein when said feature points to be checked are different in type in said first and second fingerprints, a matching process is performed by changing relation between ridges containing the feature points to be checked and ridges containing the vicinal feature points.

8. An apparatus comparing an obtained first fingerprint with a preliminarily registered second fingerprint, and determining whether or not the fingerprints match each other, comprising:

a virtual feature point generation unit generating a virtual feature point by referring to first and second feature points;

a ridge relation obtaining unit obtaining relation of a ridge containing a virtual vicinal feature point near a feature point to be checked in a matching process performed on the first and the second fingerprints to the ridge containing the feature point to be checked in the matching process; and a matching unit performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process process and comparing vicinal feature points of the first and second fingerprints, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

9. The apparatus according to claim 8, wherein information about the virtual feature point has a format comprising an identifier assigned to each virtual feature point and corresponding feature information about the virtual feature point.

10. The apparatus according to claim 8, wherein when a number of ridges from the feature point to be checked to a ridge containing the virtual vicinal feature point, and when feature information about the virtual vicinal feature points matches in a predetermined range, it is determined that feature points to be checked contained in the first and the second fingerprints are same feature points.

11. The apparatus according to claim 8, wherein when said first and second fingerprints match in at least one of position, type, and direction of the virtual vicinal feature points, it is determined that feature information of feature points to be checked contained in the first and the second fingerprints are same feature points.

12. The apparatus according to claim 8, wherein when said feature points to be checked match in position and direction in a predetermined range, but are different in type in said first and second fingerprints, a resultant matching level is low.

13. The apparatus according to claim 8, wherein when said virtual vicinal feature points match in position and direction in a predetermined range, but are different in type in said first and second fingerprints, a resultant matching level is low.

14. The apparatus according to claim 8, wherein
said virtual feature point is generated by projecting an existing feature point to a vicinal ridge.

15. The apparatus according to claim 14, wherein
feature information about the virtual feature point is feature information about a feature point from which a virtual feature point is projected.

16. The apparatus according to claim 8, wherein
when said feature points to be checked are different in type in said first and second fingerprints, a matching process is performed by changing relation between ridges containing the feature points to be checked and ridges containing the vicinal feature points.

17. An apparatus comparing an obtained first fingerprint with a preliminarily registered second fingerprint, and determining whether or not the fingerprints match each other, comprising:
a virtual feature point generation unit generating a virtual feature point by referring to first and second feature points;
a ridge relation obtaining unit obtaining relations of a ridge containing a vicinal feature point near a feature point, and a ridge containing the virtual vicinal point to be checked in a matching process performed on the first and the second fingerprints to the ridge containing the feature point to be checked in the matching process; and
a matching unit performing the matching process by searching the second fingerprint containing the vicinal feature point near the feature point to be checked in the matching process for the relation of the ridge containing the vicinal feature point to the ridge containing the feature point in the first feature point to be checked in the matching process, and performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process and comparing vicinal feature points of the first and second fingerprints, thereby determining whether or not the feature point to be checked is matching, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

18. The apparatus according to claim 17, wherein
when said feature point to be checked matches in position and direction in said first and second fingerprints in a predetermined range, but does not match in type, evaluation of a matching result is set low.

19. The apparatus according to claim 17, wherein
when said vicinal feature point or said virtual feature point matches in position and direction in a predetermined range in the first and second fingerprints, but does not match in type, evaluation of a matching result is set low.

20. The apparatus according to claim 19, wherein
a matching process is performed on a combination of the vicinal feature point of said first and second fingerprint and the virtual feature point.

21. The apparatus according to claim 17, wherein
when said first and second fingerprints match in feature points to be checked and said vicinal feature points match several times for the feature points to be checked, evaluation of a matching result is enhanced depending on a number of matching results.

22. A method for comparing an obtained first fingerprint with a preliminarily registered second fingerprint, and determining whether or not the fingerprints match each other, comprising:
obtaining relation of a ridge containing a vicinal feature point near a feature point to be checked in a matching process performed on the first and the second fingerprints to the ridge containing a feature point to be checked in the matching process; and
performing the matching process by searching the second fingerprint containing the vicinal feature point near the feature point to be checked in the matching process for the relation of the ridge containing the vicinal feature point to the ridge containing the feature point in the first feature point to be checked in the matching process and comparing vicinal feature points of the first and second fingerprints, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

23. The method according to claim 22, wherein
information about the feature point has a format comprising an identifier assigned to each feature point and corresponding feature information about the feature point.

24. The method according to claim 22, wherein
when a number of ridges from the feature point to be checked to a ridge containing the vicinal feature point, and when feature information about the vicinal feature points matches in a predetermined range, it is determined that feature points to be checked contained in the first and the second fingerprints are same feature points.

25. The method according to claim 22, wherein
in said first and second fingerprint, when feature information about the vicinal feature points matches in a predetermined range, a number of ridges between the feature point to be checked and a ridge containing the vicinal feature point matches a value obtained by counting a number of ridges in an opposite direction from the feature point to be checked to the vicinal feature point, and a number of ridges between the feature point to be checked and a ridge containing the vicinal feature point matches a value obtained by counting a number of ridges in a direction from the feature point to be checked to the vicinal feature point, it is determined that feature points to be checked contained in the first and the second fingerprints are same feature points.

26. The method according to claim 22, wherein
when said first and second fingerprints match in at least one of position, type, and direction of the vicinal feature points, it is determined that feature information of feature points to be checked contained in the first and the second fingerprints are same feature points.

27. The method according to claim 22, wherein
when said feature points to be checked match in position and direction in a predetermined range, but are different in type in said first and second fingerprints, a resultant matching level is low.

28. The apparatus according to claim 22, wherein
when said vicinal feature points match in position and direction in a predetermined range, but are different in type in said first and second fingerprints, a resultant matching level is low.

29. The apparatus according to claim 22, wherein
when said feature points to be checked are different in type in said first and second fingerprints, a matching process is performed by changing relation between ridges containing the feature points to be checked and ridges containing the vicinal feature points.

30. A method for comparing an obtained first fingerprint with a preliminarily registered second fingerprint, and determining whether or not the fingerprints match each other, comprising:
generating a virtual feature point by referring to first and second feature points;
obtaining the relation of a ridge containing a virtual vicinal feature point near a feature point to be checked in a matching process performed on the first and the second fingerprints to the ridge containing the feature point to be checked in the matching process; and
performing the matching process by searching the second fingerprint containing the virtual vicinal feature point near the feature point to be checked in the matching process for a relation of the ridge containing the virtual vicinal feature point to the ridge containing the feature point in the first feature point to be checked in the matching process and comparing vicinal feature points of the first and second fingerprints, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

31. The method according to claim 30, wherein
information about the virtual feature point has a format comprising an identifier assigned to each virtual feature point and corresponding feature information about the virtual feature point.

32. The method according to claim 30, wherein
when a number of ridges from the feature point to be checked to a ridge containing the virtual vicinal feature point, and when feature information about the virtual vicinal feature points matches in a predetermined range, it is determined that feature points to be checked contained in the first and the second fingerprints are same feature points.

33. The method according to claim 30, wherein
when said first and second fingerprints match in at least one of position, type, and direction of the virtual vicinal feature points, it is determined that feature information of feature points to be checked contained in the first and the second fingerprints are same feature points.

34. The method according to claim 30, wherein
when said feature points to be checked match in position and direction in a predetermined range, but are different in type in said first and second fingerprints, a resultant matching level is low.

35. The method according to claim 30, wherein
when said virtual vicinal feature points match in position and direction in a predetermined range, but are different in type in said first and second fingerprints, a resultant matching level is low.

36. The method according to claim 30, wherein
said virtual feature point is generated by projecting an existing feature point to a vicinal ridge.

37. The method according to claim 36, wherein
feature information about the virtual feature point is feature information about a feature point from which a virtual feature point is projected.

38. The method according to claim 16, wherein
when said feature points to be checked are different in type in said first and second fingerprints, a matching process is performed by changing relation between ridges containing the feature points to be checked and ridges containing the vicinal feature points.

39. A method for comparing an obtained first fingerprint with a preliminarily registered second fingerprint, and determining whether or not the fingerprints match each other, comprising:
generating a virtual feature point by referring to first and second feature points;
obtaining relations of a ridge containing a vicinal feature point near a feature point to be checked, and a ridge containing a virtual vicinal point to be checked in a matching process performed on the first and the second fingerprints to the ridge containing the feature point to be checked in the matching process; and
performing the matching process by searching the second fingerprint containing the vicinal feature point near the feature point to be checked in the matching process for the relation of the ridge containing the vicinal feature point to the ridge containing the feature point in the first feature point to be checked in the matching process, and performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process and comparing vicinal feature points of the first and second fingerprints, thereby determining whether or not the feature point to be checked is matching, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

40. The method according to claim 39, wherein
when said feature point to be checked matches in position and direction in said first and second fingerprints in a predetermined range, but does not match in type, evaluation of a matching result is set low.

41. The method according to claim 39, wherein
when said vicinal feature point or said virtual feature point matches in position and direction in a predetermined range in the first and second fingerprints, but does not match in type, evaluation of a matching result is set low.

42. The method according to claim 41, wherein
a matching process is performed on a combination of the vicinal feature point of said first and second fingerprint and the virtual feature point.

43. The method according to claim 39, wherein
when said first and second fingerprints match in feature points to be checked and said vicinal feature points match several times for the feature points to be checked, evaluation of a matching result is enhanced depending on a number of matching results.

44. A computer-readable storage medium storing a program for directing a computer to realize a method for comparing an obtained first fingerprint with a preliminarily registered second fingerprint, and determining whether or not the fingerprints match each other, comprising:
obtaining relation of a ridge containing a vicinal feature point near a feature point to be checked in a matching process performed on the first and the second fingerprints to the ridge containing a feature point to be checked in the matching process; and
performing the matching process by searching the second fingerprint containing the vicinal feature point near the feature point to be checked in the matching process for the relation of the ridge containing the vicinal feature point to the ridge containing the feature point in the first feature point to be checked in the matching process and comparing vicinal feature points of the first and second fingerprints, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

45. A computer-readable storage medium storing a program for directing a computer to realize a method for comparing an obtained first fingerprint with a preliminarily registered second fingerprint, and determining whether or not the fingerprints match each other, comprising:
generating a virtual feature point by referring to first and second feature points;
obtaining a relation of the ridge containing a virtual vicinal feature point near a feature point to be checked in a matching process performed on the first and the second fingerprints to the ridge containing the feature point to be checked in the matching process; and
performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process and comparing vicinal feature points of the first and second fingerprints, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

46. A computer-readable storage medium storing a program for directing a computer to realize a method for comparing an obtained first fingerprint with a preliminarily registered second fingerprint, and determining whether or not the fingerprints match each other, comprising:
generating a virtual feature point by referring to first and second feature points;
obtaining relations of a ridge containing a vicinal feature point near a feature point to be checked, and a ridge containing a virtual vicinal point to be checked in a matching process performed on the first and the second fingerprints to the ridge containing the feature point to be checked in the matching process; and
performing the matching process by searching the second fingerprint containing the vicinal feature point near the feature point to be checked in the matching process for the relation of the ridge containing the vicinal feature point to the ridge containing the feature point in the first feature point to be checked in the matching process, and performing the matching process by searching the second fingerprint containing the virtual vicinal feature point near the feature point to be checked in the matching process for the relation of the ridge containing the virtual vicinal feature point to the ridge containing the feature point in the first feature point to be checked in the matching process and comparing vicinal feature points of the first and second fingerprints, thereby determining whether or not the feature point to be checked is matching, and wherein when said first and second fingerprints match in all of position, type, and direction associated with a ridge direction of the vicinal feature points where feature point direction is ridge direction when the feature point is an end point and a direction of a larger number of ridges when the feature point is a bifurcation point, it is determined that feature information of feature points to be checked contained in the first and the second fingerprints are same feature points.

47. A method of comparing first and second fingerprints, comprising:
identifying feature points of the first and second fingerprints in fingerprint ridges;
comparing feature point information of a target feature point of a ridge of the first fingerprint with a corresponding feature point of a ridge in the second fingerprint where the feature point information compared includes position, type and direction;
comparing the feature point information of feature points neighboring the target and corresponding feature points in corresponding ridges, respectively, in the first and section fingerprints; and
determining whether there is a match between the first and second feature points responsive to the comparisons with a match existing when there is a match in all position, type and direction associated with a ridge direction in vicinal feature points where feature point direction is ridge direction when the feature point is an end point and a direction of a larger number of ridges when the feature point is a bifurcation point.

48. A method of comparing first and second fingerprints, comprising:
- identifying vicinal feature points of the first and second fingerprints in fingerprint ridges associated with a target feature point which is a feature point to be checked;
- comparing position, type and direction of a vicinal feature point in the first fingerprint with position, type and direction associated with a ridge direction of a corresponding vicinal feature point in the second fingerprint where feature point direction is ridge direction when the feature point is an end point and a direction of a larger number of ridges when the feature point is a bifurcation point; and
- determining whether there is a match between the first and second vicinal feature points responsive to the comparison.

49. A method, comprising:
- identifying vicinal feature points of first and second fingerprints in fingerprint ridges associated with target feature points which are features point to be checked in the first and second fingerprints, respectively;
- comparing a target vicinal feature point in the first fingerprint with position, type and direction of a corresponding vicinal feature point in the second fingerprint where feature point direction is ridge direction when the feature point is an end point and a direction of a larger number of ridges when the feature point is a bifurcation point;
- determining whether there is a match between the first and second vicinal feature points responsive to the comparison; and
- indicating that the target feature points in the first and second fingerprints match responsive to the comparison.

* * * * *

UNITED STATES PATENT AND TRADEMARK OFFICE
CERTIFICATE OF CORRECTION

PATENT NO. : 7,151,846 B1
APPLICATION NO. : 09/665159
DATED : December 19, 2006
INVENTOR(S) : Yasaku Fujii It is certified that error appears in the above-identified patent and that said Letters Patent is hereby corrected as shown below:

On Title Page, Item (75) (Inventor), Line 1, change "Yusaka" to --Yusaku--.

On Title Page Item (56), (Other Publications), Line 1, change "et a.," to --et al.,--.

Column 26, Line 26, after "matching process" delete "process".

Signed and Sealed this

Third Day of April, 2007

JON W. DUDAS
*Director of the United States Patent and Trademark Office*